(12) United States Patent
Tanigawa et al.

(10) Patent No.: US 8,660,396 B2
(45) Date of Patent: Feb. 25, 2014

(54) MULTI-CLADDING OPTICAL FIBER, OPTICAL FIBER MODULE, FIBER LASER, AND FIBER AMPLIFIER

(75) Inventors: Shoji Tanigawa, Sakura (JP); Kentaro Ichii, Sakura (JP); Katsuhiro Takenaga, Sakura (JP); Kunimasa Saitoh, Sapporo (JP)

(73) Assignees: Fujikura Ltd., Tokyo (JP); National University Corporation Hokkaido University, Sapporo-shi (JP)

( * ) Notice: Subject to any disclaimer, the term of this patent is extended or adjusted under 35 U.S.C. 154(b) by 352 days.

(21) Appl. No.: 13/216,885

(22) Filed: Aug. 24, 2011

(65) Prior Publication Data

US 2011/0305251 A1 Dec. 15, 2011

Related U.S. Application Data

(63) Continuation of application No. PCT/JP2010/003745, filed on Jun. 4, 2010.

(30) Foreign Application Priority Data

Jun. 17, 2009 (JP) ................................ 2009-144630

(51) Int. Cl.
*G02B 6/02* (2006.01)
(52) U.S. Cl.
USPC ........................................................ 385/127
(58) Field of Classification Search
USPC ........................................................ 385/127
See application file for complete search history.

(56) References Cited

U.S. PATENT DOCUMENTS 6,487,340 B2 * 11/2002 Enomoto et al. ................ 385/37
6,535,678 B1 3/2003 Yamauchi et al.
6,941,053 B2 9/2005 Lauzon et al.
(Continued)

FOREIGN PATENT DOCUMENTS

JP 51-113641 A 10/1976
JP 55-29847 A 3/1980
(Continued)

OTHER PUBLICATIONS

Shojiro Kawakami, et al., Advance Electronics I-16 Hikari Fiber to Fiber-kei Device, Jul. 10, 1996 pp. 41, 42, 52 and 53, 1st edition, Baifukan Co., Ltd.

(Continued)

*Primary Examiner* — Uyen Chau N Le
*Assistant Examiner* — Hoang Tran
(74) *Attorney, Agent, or Firm* — Sughrue Mion, PLLC

(57) ABSTRACT

Provided is a multi-cladding optical fiber which includes: a core with an average refractive index $n1$; and a cladding including an inner cladding with an average refractive index $n2$ formed on the periphery of the core, an intermediate cladding with an average refractive index $n3$ formed on the periphery of the inner cladding, and an outer cladding with an average refractive index $n4$ formed on the periphery of the intermediate cladding where $n1>n2>n3>n4$. Two or more axisymmetric modes exist in the core at a wavelength of the signal light; the two or more axisymmetric modes including a fundamental mode and at least a high-order mode. When the fiber is bent at a predetermined bending diameter, the high-order mode in the core disperses within the inner cladding due to coupling with an inner cladding mode, so that only the fundamental mode substantially propagates through the core.

15 Claims, 14 Drawing Sheets

(56) References Cited

U.S. PATENT DOCUMENTS

| | | |
|---|---|---|
| 7,050,686 B2 | 5/2006 | Farroni et al. |
| 2004/0156401 A1 | 8/2004 | Sandrock et al. |
| 2009/0060437 A1 | 3/2009 | Fini et al. |

FOREIGN PATENT DOCUMENTS

| | | |
|---|---|---|
| JP | 2000-347057 A | 12/2000 |
| JP | 3298799 B2 | 7/2002 |
| JP | 2006-519495 A | 8/2006 |
| JP | 2006-292893 A | 10/2006 |
| JP | 2008-310328 A | 12/2008 |
| JP | 2010-1193 A | 1/2010 |

OTHER PUBLICATIONS

Takari Okoshi, et al., Hikari Fiber, Apr. 30, 1983, pp. 73-75, 1st print, Ohmsha, Ltd.

Jay W. Dawson, et al., "Large flattened mode optical fiber for reduction of non-linear effects in optical fiber lasers", Proceedings of the SPIE, 2004, pp. 132-139, vol. 5335.

Jeffrey P. Koplow, et al., "Single-mode operation of a coiled multimode fiber amplifier", Optics Letters, Apr. 1, 2000, pp. 442-444, vol. 25, No. 7.

J. Limpert, et al., "Extended single-mode photonic crystal fiber lasers", Optics Express, 2006, pp. 2715-2720, vol. 14, No. 7.

Hugh A. McKay, et al., "Single-mode Optical Fibres with Record Core Diameters", Proceedings of the ECOC, 2008, 2 pages, vol. 7-1.

Liang Dong, et al., "Robust and Practical Optical Fibers for Single Mode Operation with Core Diameters up to 170 µm", Proceedings of the CLEO/QELS, 2008, 2 pages.

M. Craig Swan, et al., "33 µm Core Effectively Single-Mode Chirally-Coupled-Core Fiber Laser at 1064-nm", Proceedings of the OFC/NFOEC, 2009, 3 pages.

John M. Fini, "Design of solid and microstructure fibers for suppression of higher-order modes", Optics Express, May 2, 2005, pp. 3477-3490, vol. 13, No. 9.

J. M. Fini, et al., "Solid low-bend-loss transmission fibers using resonant suppression of higher-order modes", Proceedings of the ECOC, 2008, 2 pages, vol. 1.

John M. Fini, "Bend-resistant design of conventional and microstructure fibers with very large mode area", Optics Express, 2006 pp. 69-81, vol. 14, No. 1.

Ming-Jun Li, et al., "Effective Area Limit for Large Mode Area Laser Fibers", Proceedings of OFC/NFOEC, 2008, 3 pages.

Kuniaki Kakihara, et al., "Full-vectorial finite element method in a cylindrical coordinate system for loss analysis of photonic wire bends", Optics Express, 2006, pp. 11128-11141, vol. 14, No. 23.

Y. Tsuchida, et al., "Low-Bending-Loss Single-Mode Holey Fibers with Large Mode Area", 2006 IEICE General Conference, 3 pages including English translation.

International Search Report for PCT/JP2010/003745 dated Jun. 29, 2010.

\* cited by examiner

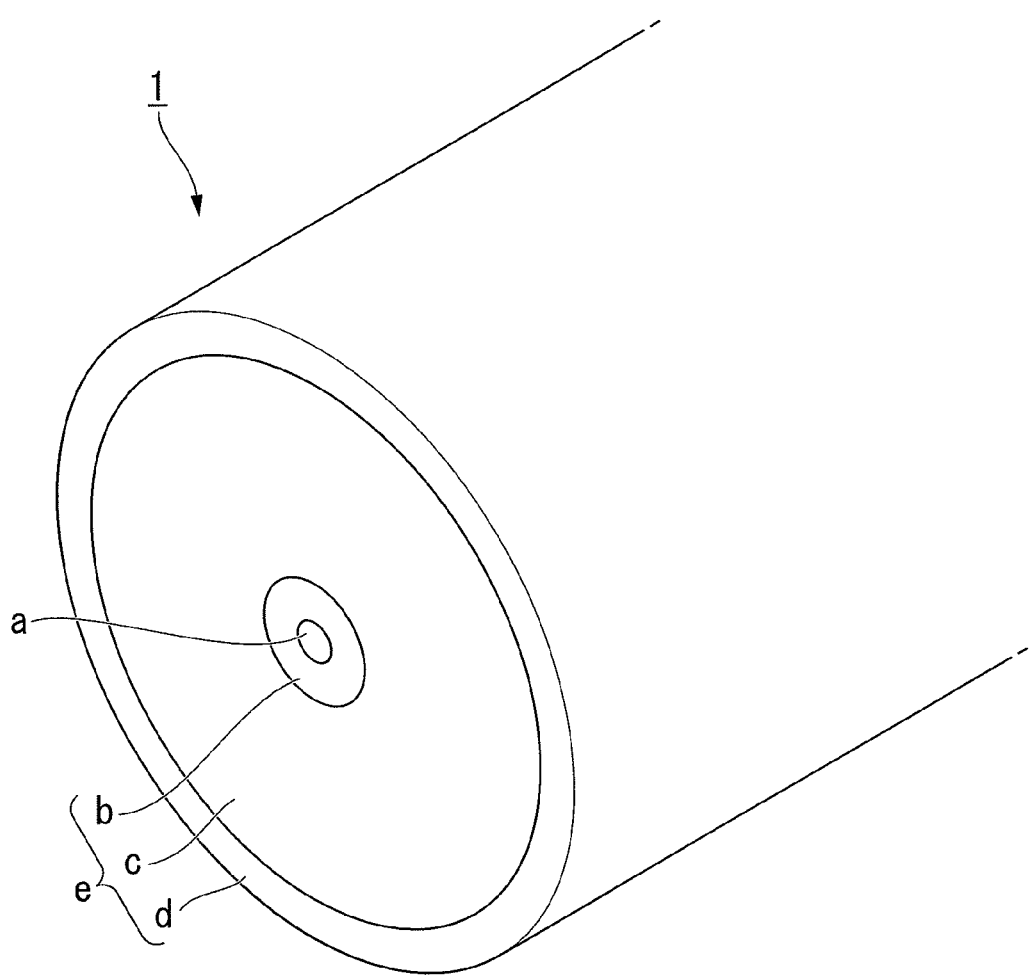

MULTI-CLADDING OPTICAL FIBER, OPTICAL FIBER MODULE, FIBER LASER, AND FIBER AMPLIFIER

CROSS REFERENCE TO RELATED APPLICATIONS

This application is a continuation application based on a PCT Patent Application No. PCT/JP2010/003745, filed Jun. 4, 2010, whose priority is claimed on Japanese Patent Application No. 2009-144630 filed Jun. 17, 2009, the entire content of which are hereby incorporated by reference.

BACKGROUND OF THE INVENTION

1. Field of the Invention

The present invention relates to a multi-cladding optical fiber that is suited to the transmission of high-power light, an optical fiber module that has the optical fiber, a fiber laser and a fiber amplifier.

2. Description of the Related Art

In recent years, there have been dramatic advances in the output power level of fiber amplifiers and fiber lasers. Accompanying these advances in increased output power, improvements in endurance to high-power light have been desired for various optical fiber components such as rare earth-doped optical fibers that are applied to fiber amplifiers and fiber lasers. When considering the endurance of optical fibers to high-power light, it is important to suppress the influences imparted by optical damage and nonlinear optical effects. Optical damage and nonlinear optical effects are both phenomena that occur when the optical power density (the optical, power per unit area of the light propagation cross section) is high. Accordingly, in order to obtain a high output power while suppressing the occurrence of optical damage and nonlinear optical effects, the optical power density should be lowered. In order to lower the optical power density without lowering the output power, it is a promising candidate to increase the cross-sectional area through which light passes (light propagation cross-sectional area). Usually, the effective core cross-sectional area ($A_{eff}$) that is defined by Equation (1) given below is used as an indicator.

[Equation 1]

$$A_{eff} = \frac{2\pi \left[ \int_0^\infty |E(r)|^2 r\, dr \right]^2}{\int_0^\infty |E(r)|^4 r\, dr} \quad (1)$$

In Equation (1), E(r) indicates the electric field distribution of light in the optical fiber, and r indicates the distance in the radial direction from the axial center of the optical fiber.

From such a viewpoint, a method of enlarging the effective core cross-sectional area has been actively studied in recent years.

For example, Non-patent Document 1 (Proceedings of the SPIE, Vol. 5335, pp. 132-139) discloses a method of enlarging the effective core cross-sectional area by changing the refractive-index profile of the optical fiber core.

Non-patent Document 2 (Optics Letters, Vol. 25, pp. 442-444 (2000)) discloses a method of substantially realizing single-mode propagation in a multimode optical fiber in which the effective core cross-sectional area is large by bending the optical fiber to induce bending loss in the high-order modes selectively, even in an optical fiber in which high-order modes exist.

Non-patent Document 3 (Optics Express, Vol. 14, pp. 2715-2720 (2006)) and Non-patent Document 4 (Proceedings of the ECOC 2008, Th. 3. C. 1 (2008)) respectively disclose a method of effective core cross-sectional area enlargement that uses a photonic crystal fiber (PCF) structure, and a method of effective core cross-sectional area enlargement by reducing the relative refractive index difference.

Non-patent Document 5 (Proceedings of CLEO/QELS 2008, CPDB6 (2008)) discloses a method of effective core cross-sectional area enlargement that uses a leakage fiber.

Non-patent Document 6 (Proceedings of OFC/NFOEC 2008, OWU2 (2008)), Non-patent Document 7 (Optics Express, 13, pp. 3477-3490 (2005)), and Non-patent Document 8 (Proceedings of ECAC 2008, Mo. 4. B. 4 (2008)) disclose a method of coupling the higher-order modes, and removing only them around a core, and substantially realizing a single mode propagation.

However, in the method disclosed in Non-patent Document 1, the cut-off wavelength ends up being lengthened together with the enlargement of the effective core cross-sectional area, and giving rise to the problem of a trade-off occurring between the single-mode propagation required for maintaining beam quality and effective core cross-sectional area enlargement. Moreover, in the refractive index profile of the optical fiber that is disclosed in Non-patent Document 1, there has also been the problem of the effective core cross-sectional area becoming significantly smaller when the fiber is used in a bent condition (a detailed study result is given in Optical Express, 14, pp. 69-81 (2006) in relation to the behavior of the effective core cross-sectional area when bent).

Also, the method that is disclosed in Non-patent Document 2 has been comparatively widely used recently, but as disclosed in Proceedings of OFC/NFOEC 2008, OTuJ2 (2008) (hereinafter abbreviated as Non-patent Document 9), there have been the problems of being the presence of a limit in enlargement of the effective core cross-sectional area affected by a reduction in the effective core cross-sectional area when bent, and as a result, it is impossible to sufficiently enlarge the effective core cross-sectional area, and in consideration of a bent condition, the outer diameter of the core being essentially limited to around 25 μm (320 μm² when converted to the effective core cross-sectional area).

Also, in the methods disclosed in Non-patent Documents 3 and 4, since these fiber structures are sensitive to bending, it cannot be used in a bent condition, and so the problem arises of not being able to realize a compact fiber amplifier and fiber laser.

The method disclosed in Non-patent Document 5 is the same as the method disclosed in Non-patent Documents 3 and 4 on the point of the leakage fiber being sensitive to bending, and since the transmission loss is principally large, there is the problem of raising the lasing efficiency of the laser or amplifying efficiency of the amplifier being difficult.

The methods disclosed in Non-patent Documents 6 to 8 can effectively remove higher-order modes, but the refractive index profile and fiber structure is extremely complicated, and moreover since extremely high precision controls of refractive index profile and fiber structure are required, there have been the problems that fiber manufacturing is difficult, as a result, the manufacturing costs become high, and the yields become low.

The present invention was achieved in view of the aforementioned circumstances, and has an object of providing an optical fiber having a simple structure and capable of substantial single-mode propagation and enlargement of the effective core cross-sectional area.

SUMMARY (1) A multi-cladding optical fiber according to an aspect of the present invention includes: a core with an average refractive index n1 that guides a signal light; and a cladding comprising an inner cladding with an average refractive index n2 that is formed on the periphery of the core, an intermediate cladding with an average refractive index n3 that is formed on the periphery of the inner cladding, and an outer cladding with an average refractive index n4 that is formed on the periphery of the intermediate cladding to confine a pumping light to the intermediate cladding or inner; wherein the refractive indices n1 to n4 satisfy the relationship of n1>n2>n3>n4; two or more axisymmetric modes exist in the core at a wavelength of the signal light; the two or more axisymmetric modes include a fundamental mode and at least a high-order mode that is an axisymmetric mode of a higher order than the fundamental mode; and when bent at a predetermined bending diameter, the high-order mode(s) in the core disperses within the inner cladding due to coupling with the inner cladding mode, so that only the fundamental mode substantially propagates in the core through the fiber.

(2) The multi-cladding optical fiber according to the aforementioned (1) may be bent at a predetermined bending diameter.

(3) In the multi-cladding optical fiber according to the aforementioned (1) or (2), the outer diameter of the inner cladding may be two times or more the outer diameter of the core.

(4) In the multi-cladding optical fiber according to the aforementioned (3), the outer diameter of the inner cladding may be five times or less the outer diameter of the core, and 130 µm or less.

(5) In the multi-cladding optical fiber according to the aforementioned (4), the outer diameter of the core may be 25 to 50 µm, and the relative refractive index difference between the core and the inner cladding may be 0.05 to 0.13%.

(6) In the multi-cladding optical fiber according to the aforementioned (1) or (2), only an $LP_{01}$ mode and an $LP_{02}$ mode that is of a higher order than the $LP_{01}$ mode may exist as the axisymmetric modes, and higher order modes equal to or greater than an $LP_{03}$ mode that is a lowest higher order mode than the $LP_{02}$ mode, may not exist.

(7) In the multi-cladding optical fiber according to the aforementioned (6), the outer diameter of the inner cladding may be two times or more the outer diameter of the core.

(8) In the multi-cladding optical fiber according to the aforementioned (7), the outer diameter of the inner cladding may be five times or less the outer diameter of the core, and 130 µm or less.

(9) In the multi-cladding optical fiber according to the aforementioned (8), the outer diameter of the core may be 35 to 50 µm, and the relative refractive index difference between the core and the inner cladding may be 0.05 to 0.10%.

(10) In the multi-cladding optical fiber according to the aforementioned (8), the outer diameter of the core may be 25 to 35 µm, and the relative refractive index difference between the core and the inner cladding may be 0.07 to 0.13%.

(11) In the multi-cladding optical fiber according to the aforementioned (1) or (2), only an $LP_{01}$ mode, an $LP_{02}$ mode that is of a higher order than the $LP_{01}$ mode, and an $LP_{03}$ mode that is of a higher order than the $LP_{02}$ mode may exist as the axisymmetric modes, and the $L1^3_{02}$ mode may disperses within the inner cladding due to coupling with an inner cladding mode, and the $LP_{03}$ mode may disperses within the inner cladding by bending loss.

(12) In the multi-cladding optical fiber according to the aforementioned (11), the outer diameter of the inner cladding may be two times or more the outer diameter of the core.

(13) In the multi-cladding optical fiber according to the aforementioned (12), the outer diameter of the inner cladding may be five times or less the outer diameter of the core, and 130 µm or less.

(14) In the multi-cladding optical fiber according to the aforementioned (13), the outer diameter of the core may be 35 to 50 µm, and the relative refractive index difference between the core and the inner cladding may be 0.08 to 0.13%.

(15) In the multi-cladding optical fiber according to any one of the aforementioned (1) to (14), the predetermined bending diameter may be 80 to 200 mm.

(16) In the multi-cladding optical fiber according to any one of the aforementioned (1) to (15), the core may be doped with a luminescent material.

(17) In the multi-cladding optical fiber according to the aforementioned (16), the luminescent material may be a rare earth element.

(18) An optical fiber module according to an aspect of the present invention is formed by winding the multi-cladding optical fiber according to any one of the aforementioned (1) to (17).

(19) A fiber laser or fiber amplifier according to an aspect of the present invention includes the multi-cladding optical fiber according to any one of the aforementioned (1) to (17) or the optical fiber module according to the aforementioned (18).

The above-described aspects of the present invention can provide an optical fiber having a simple structure and in which substantial single-mode propagation and enlargement of the effective core cross-sectional area are possible. Also, by using the optical fiber, it is possible to provide an optical fiber module, a fiber laser and a fiber amplifier with good optical characteristics.

BRIEF DESCRIPTION OF THE DRAWINGS

FIG. 3A is a view that schematically shows an embodiment of the multi-cladding optical fiber of the present invention.

DETAILED DESCRIPTION OF THE PREFERRED EMBODIMENTS

Hereinafter, embodiments of the present invention shall be described in detail.
<Multi-Cladding Optical Fiber>

FIG. 3A is a view that schematically shows an embodiment of a multi-cladding optical fiber 1 of the present embodiment (hereinafter referred to simply as optical fiber 1, or fiber 1). The multi-cladding optical fiber 1 of the present embodiment is provided with at least a core a with an average refractive index n1 that guides a signal light; and a cladding e including an inner cladding b with an average refractive index n2 that is formed on the periphery of the core a, an intermediate cladding c with an average refractive index n3 that is formed on the periphery of the inner cladding b, and an outer cladding d with an average refractive index n4 that is formed on the periphery of the intermediate cladding layer c to confine a pumping light to the intermediate cladding c or inner. Also, in the multi-cladding optical fiber 1 of the present embodiment, the refractive indices n1 to n4 satisfy the relationship of n1>n2>n3>n4; there are two or more axisymmetric modes in the core a at a wavelength of the signal light (that is, a fundamental mode and an axisymmetric mode(s) of a higher order(s) than the fundamental mode (high-order mode(s))); and when bent at a predetermined bending diameter, the high-order mode(s) in the core a disperses within the cladding e due to coupling with a mode(s) of the inner cladding, so that only the fundamental mode substantially propagates through the core a.

The multi-cladding optical fiber 1 of the present embodiment is provided with at least the inner cladding b, the intermediate cladding c, and the further outer cladding d, and average refractive indices thereof must satisfy the relationship of n1>n2>n3>n4. Thereby, by using the optical fiber bent at a predetermined bending diameter, among the two or more axisymmetric modes in the core a, only the fundamental mode propagates in the core a, and substantial single-mode propagation becomes possible.

Figure 22:
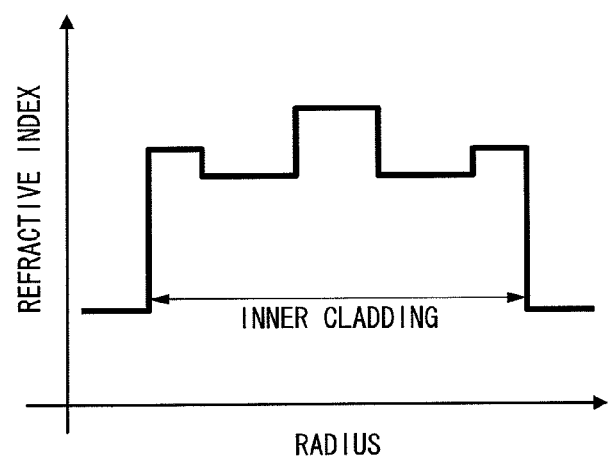
FIG. 22 is a graph that shows the refractive index profile of the multi-cladding optical fiber according to an embodiment of the present invention in which the inner cladding has an inhomogeneous refractive index profile.

In the multi-cladding optical fiber 1 of the present embodiment, as shown for example in FIG. 22, the inner cladding b may have an inhomogeneous refractive index profile (the inner cladding b may also be a plurality of layers), the intermediate cladding c and/or the outer cladding d may have an inhomogeneous refractive index profile, and it may have a segmented core-type core a. In this way, in the case of an optical fiber that has an inhomogeneous refractive index profile in at least any of these portions a to d, as for the refractive indices of these portions a to d, the average refractive indices of the core a, the inner cladding b, the intermediate cladding c and the outer cladding d should satisfy the relationship of $n1>n2>n3>n4$.

The core a, the inner cladding b, the intermediate cladding c and the outer cladding d may be manufactured with heretofore known materials. Normally, the core a, the inner cladding b, and the intermediate cladding c are preferably made of glass. The outer cladding d may be produced with a polymer, and may also be produced with glass such as holey clad or the like.

The aforementioned n1 to n4 can be suitably adjusted by the types of materials and additive dopants that constitutes the core a and the various claddings b to d.

The optical fiber 1 of the present embodiment should technical-terminologically be called a substantial single-mode optical fiber in which the effective core cross-sectional area is enlarged in a multi-cladding optical fiber.

Although there are various methods of calculating the properties of an optical fiber when uniformly bending the optical fiber with the same curvature radius, in this invention, technical explanation of the optical fiber in the present embodiment shall be described based on a method called equivalent index method that calculates by converting the effects of bending of the waveguide to an equivalent straight waveguide (for example, refer to Optics Express, Vol. 14, pp. 69-81 (2006)), as one that can be most intuitively understood.

Figure 1A:
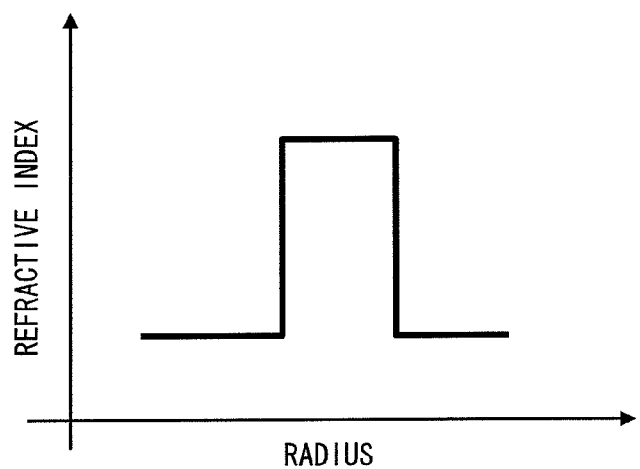
FIG. 1A is a schematic view that illustrates an example of the refractive index profile of a conventional optical fiber.
Figure 1B:
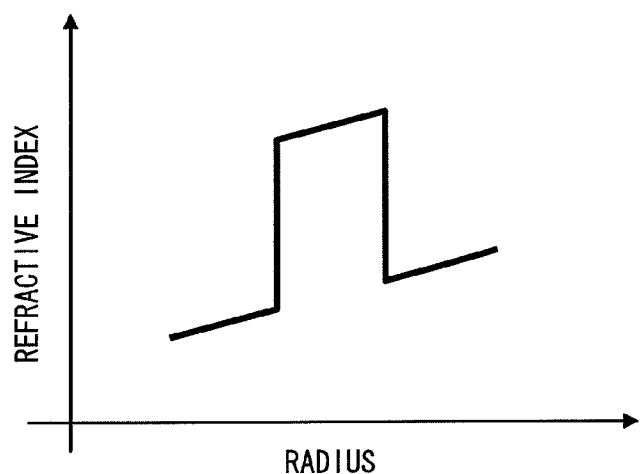
FIG. 1B is a schematic view that illustrates an example of the refractive index profile of an equivalent straight waveguide when bending an optical fiber that has the refractive index profile shown in FIG. 1A.
Figure 2A:
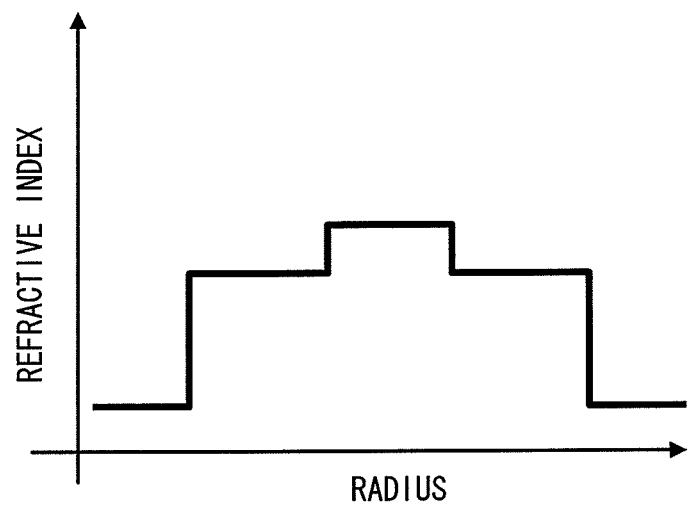
FIG. 2A is a schematic view that illustrates an example of the refractive index profile of the multi-cladding optical fiber around the core, according to an embodiment of the present invention.
Figure 2B:
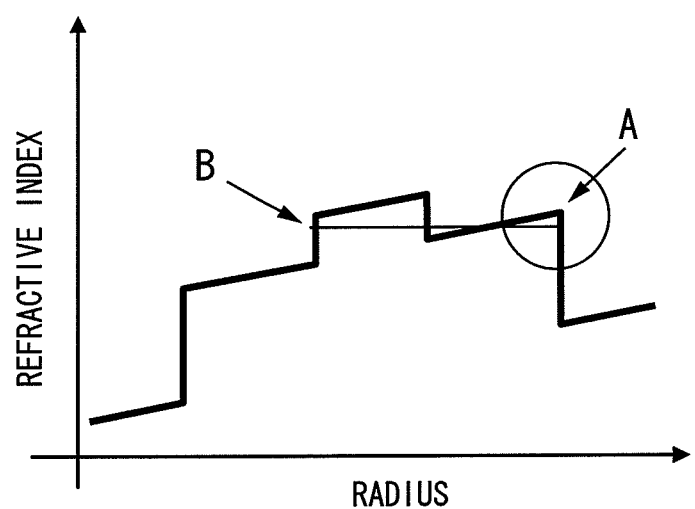
FIG. 2B is a schematic view that illustrates an example of the refractive index profile of an equivalent straight waveguide when bending the multi-cladding optical fiber around the core, according to an embodiment of the present invention shown in FIG. 2A.

When an optical fiber that has a certain refractive index profile as shown in FIG. 1A is bent, the refractive index profile of the equivalent straight waveguide of that optical fiber becomes inclined in one way, as shown in FIG. 1B. On the other hand, FIG. 2B shows the refractive index profile of an equivalent straight waveguide when bending a multi-cladding optical fiber that has an inner cladding and an intermediate cladding as in the present invention (a multi-cladding optical fiber that has the refractive index profile as shown in FIG. 2A). Note that these are schematic views and do not necessarily reflect actual size proportions. When an optical fiber is bent to a certain specified diameter (bending diameter), a section with a high refractive index compared to the surrounding clad appears (the high refractive index portion is a section shown by the letter A in FIG. 2B). The present invention was accomplished based on the new findings of this high refractive index portion A having a mechanism that effectively removes only high-order modes of the core a by setting the bending diameter to a certain suitable range, in the same way as removing only the axisymmetric mode of a higher order than the fundamental mode (high-order mode) of the core with the clad waveguide structure like the structure disclosed in Non-patent Document 6 to 8 (for example, see Optics Express, 13, pp. 3477-3490 (2005)). FIG. 4 shows the calculated result of the bending diameter dependency of the ratio of signal light power of each axisymmetric mode that exists in the core region ($\Gamma$ value), calculated from the refractive index profile shown in FIG. 3B. In FIG. 4, "1st" indicates the lowest-order cladding mode (1st cladding mode), and "2nd" indicates a higher-order cladding mode after the lowest-order cladding mode (2nd cladding mode). This is the same in the following figures as well. The full-vectorial finite-element method in a local cylindrical coordinate system (for example, refer to Optics Express, Vol. 14, pp. 11128-11141 (2006)) is applied to the calculation. Also, the calculation wavelength is 1064 nm. Here, the $\Gamma$ value is as defined in Equation (2) below. Note that in the multi-cladding optical fiber 1 that has the refractive index profile shown in FIG. 3B, the relative refractive index difference is 0.1% between the core a with an average refractive index of n1 and the inner cladding b with an average refractive index of n2, the relative index difference is 0.3% between the inner cladding b with an average refractive index of n2 and the intermediate cladding c with an average refractive index of n3, and the relative index difference is approximately 5.5% between the intermediate cladding c with an average refractive index of n3 and the outer cladding d with an average refractive index of n4. Also, the outer diameter of the core a is 30 μm, the outer diameter of the inner cladding b is 90 μm, the outer diameter of the intermediate cladding c is 400 μm, and the outer diameter of the outside cladding d is 440 μm.

[Equation 2]

$$\Gamma = \frac{\int_{core} |\phi(x, y)|^2 \, dxdy}{\int |\phi(x, y)|^2 \, dxdy} \quad (2)$$

In Equation (2), $\phi(x, y)$ shows the main electric fields at a given point (x, y in the radial cross section of a fiber). In FIG. 4, the $\Gamma$ value changes monotonically with respect to the bending diameter in(?) $LP_{01}$ that is the fundamental mode, and this means that optical power leaks from the core by bending loss. By contrast, a region, for example in the vicinity of the bending diameters of approximately 130 mm and approximately 95 mm, exists where the $\Gamma$ value rapidly decreases at $LP_{02}$ that is an axisymmetric mode that is of a higher order than the fundamental mode (high-order mode). This means that the core mode (here, the $LP_{02}$ mode) and the cladding mode that is due to the clad waveguide structure arising due to bending are resonance-coupled (transferred between optical power modes, or mode coupled) (illustrated by the straight-line indicated by the letter B in FIG. 2B). In mode coupling, in the case of the propagation constants of coupled modes being close, it is known that the power transfer efficiently occurs, and for example, here in the vicinity of the bending diameters of approximately 130 mm and approximately 95 mm, it is estimated that the propagation constants of the $LP_{02}$ mode of the core a and the cladding mode approximately match. For that reason, mode coupling occurs in the vicinity of this bending diameter, and only the $LP_{02}$ mode (high-order mode) in the core a leaks into the cladding e. Regarding the $LP_{01}$ mode (fundamental mode) in the core a, since a cladding mode in which the propagation constants match does not appear in the range of the calculated bending diameter, the power leakage into the clad e hardly occurs other than the leakage caused by the bending loss. Also, as is evident from FIG. 4, in the vicinity of the bending diameters of approximately 130 mm and approximately 95 mm, since the monotonic reduction in the $\Gamma$ value of the fundamental mode is sufficiently small, providing this level of bending diameter, the leakage of the fundamental mode due to this bend is small enough to be ignored. Accordingly, for example, when the fiber length is I m or more since only the high-order mode in the core a leaks into the clad e, and the fundamental mode remains in the core a, substantial single-mode propagation becomes possible. If single-mode propagation can be realized, for example, in the case of constituting a fiber laser or fiber amplifier using the optical fiber 1, since it is also possible to make the output beam to be a single-mode beam, output light is obtained in which the beam quality is good, and in which the beam can be focused narrowly. Thereby, for example by raising the power density of the output light it is possible to efficiently process or finely process objectives.

The multi-cladding optical fiber 1 of the present embodiment differs from the optical fiber disclosed for example in Optics Express Vol. 13, pp. 3477-3490 (2005) on the point of the clad waveguide structure being initially induced by bending in the present embodiment. Since the optical fiber disclosed in the concerned document imparts a clad waveguide structure as a refractive index profile, although it has the advantage of being capable or removing a high-order mode regardless of the presence of bending to the fiber, the design/manufacture of the clad waveguide structure must be precisely carried out, and so there is the problem of not being able to readily manufacture it due to its variations in the geometrical structure and refractive index profile during manufacture. Also, since the clad waveguide structure undergoes change when bent, there is also the problem of the properties being altered with the bending diameter. In contrast, the multi-cladding optical fiber 1 of the present embodiment can be readily manufactured since the refractive index structure is simple. And even if shifting occurs in the mode coupling condition due to variations in the geometrical structure and refractive index profile during manufacture, since the desired properties can be obtained by adjusting the bending diameter in actual use, it is possible to make use of a wide variety of qualities of fibers with uses having a high flexibility, and the tolerance of manufacturing and the variety usage are high. Moreover, by bending the fiber with gradually or distributedly changing the bending diameter in the lengthwise direction intentionally, the tolerance of manufacturing and the variety usage are further raised. In this way, it is possible to provide the multi-cladding optical fiber 1 of the present embodiment at a low cost as a substantial single-mode optical fiber in which the effective core cross-section is enlarged. Here, being substantially single mode indicates that the ratio of the axisymmetric fundamental mode of the core a and the axisymmetric high-order mode at the signal light wavelength in actual usage environment is 19.3 dB or more. This means it is the same identifying criterion of single mode as disclosed in ITU-T (International Telecommunication Union Telecommunication Standardization Sector) Recommendation G.650.1, although the usage (measurement) environment and high-order mode of interest differ from Recommendation G.650.1.

However, since the aforementioned definition of substantial single mode is influenced by other factors in addition to the launching condition of light to the fiber, the mode dependent gain in the fiber (due to the luminescent material of the rare earth element or the like) as well as the property of waveguide structure itself of the fiber, there is the problem being difficult to measure the aforementioned ratio. Accordingly, based on the aforementioned definition, "a confinement loss of the axisymmetric high-order mode (for example, the $LP_{02}$ mode) being a certain value or greater when the optical fiber when bent to a certain bending diameter" also serves as an another candidate of determining substantial single mode which expresses the single-mode characteristic of the waveguide structure (for example, refer to the 2006 IEICE General Conference, C-3-86 (2006)). In the present invention, "a confinement loss of the axisymmetric high-order mode (for example, the $LP_{02}$ mode) being 1 dB/turn or greater" serves as the condition of substantial single mode. A confinement loss of 1 dB/turn or greater means that the $\Gamma$ value is approximately 0.80 or less (publicly known to a person of ordinary skill in the art from the relationship between decibel and optical power ratio), and this $\Gamma$ value of approximately 0.80 or less can be realized where a bending diameter in the vicinity of approximately 130 mm and in the vicinity of approximately 95 mm as described in FIG. 4.

Hereinafter, the numerical ranges of the preferred parameters for obtaining the aforementioned function shall be described.

In the present invention, the outer diameter of the inner cladding b is preferably two times or more the outer diameter of the core a. The reason for that is given below.

Figure 17:
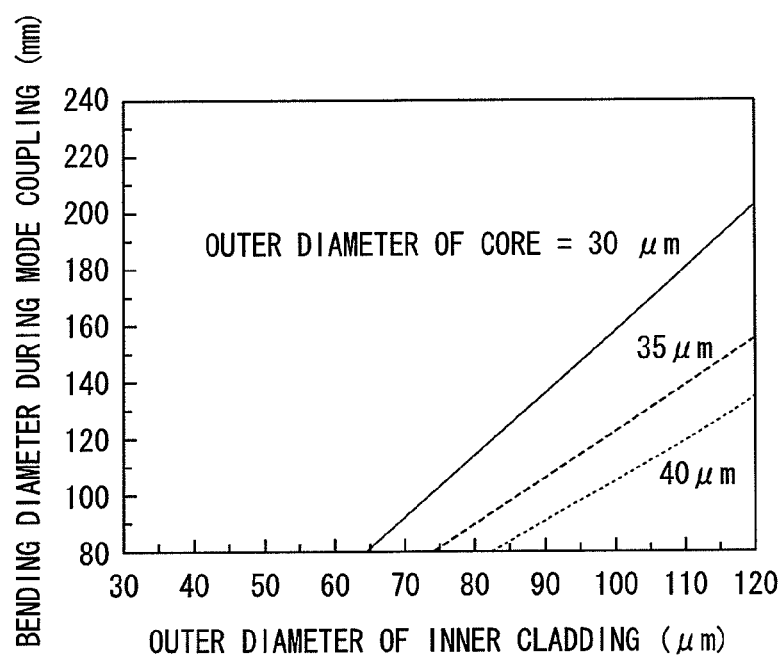
FIG. 17 is a graph that shows the relationship between the outer diameter of the inner cladding and the bending diameter at which mode coupling with the lowest-order (1st) cladding mode occurs.
Figure 18:
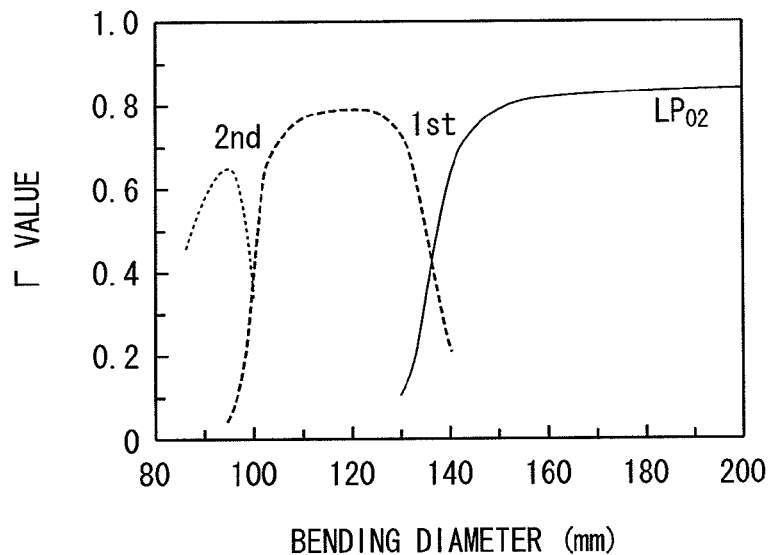
FIG. 18 is a graph that shows the relationship between the Γ value and the bending diameter in the multi-cladding optical fiber according to an embodiment of the present invention in which the relative refractive index difference between the core and the inner cladding is 0.10%.
Figure 19:
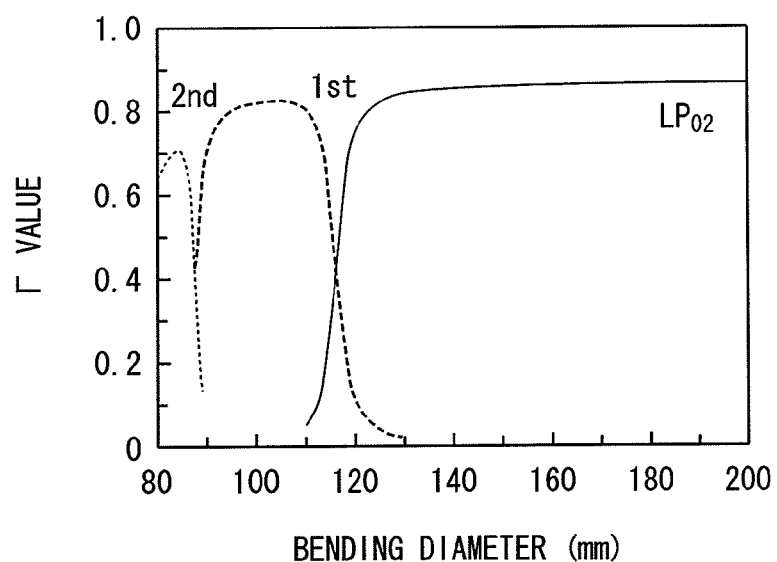
FIG. 19 is a graph that shows the relationship between the Γ value and the bending diameter in the multi-cladding optical fiber according to an embodiment of the present invention in which the relative refractive index difference between the core and the inner cladding is 0.11%.
Figure 20:
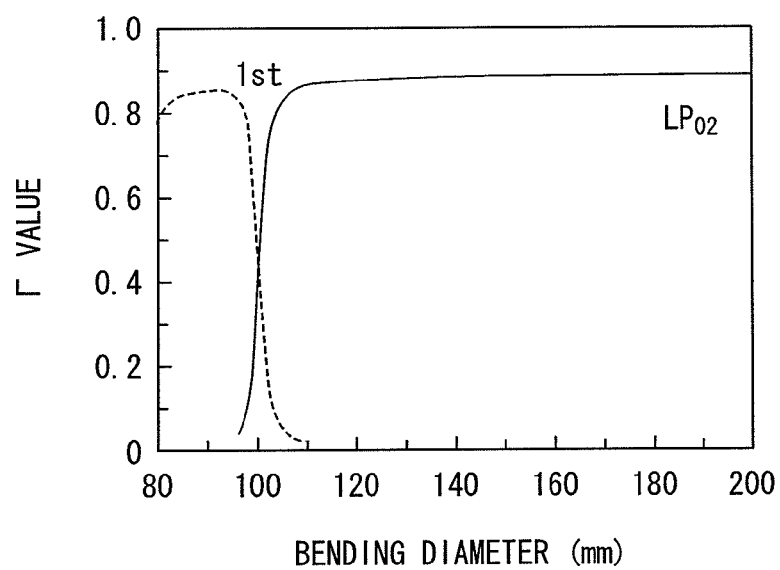
FIG. 20 is a graph that shows the relationship between the value and the bending diameter in the multi-cladding optical fiber according to an embodiment of the present invention in which the relative refractive index difference between the core and the inner cladding is 0.12%.

FIGS. 5 to 8 are graphs that show the relationship the bending diameter and the $\Gamma$ value when the outer diameter of the core a is fixed to 30 μm, the relative refractive index difference between the core a and the inner cladding b to 0.1%, and the relative refractive index difference between the inner cladding b and the intermediate cladding c to 0.3%, and the outer diameter of the inner cladding b is changed. Note that in FIGS. 7 and 8, "3rd" indicates a high-order cladding mode after "2nd" (3rd cladding mode). This also applies to the subsequent figures. As is evident from these graphs, as the outer diameter of the inner cladding b becomes smaller, the bending diameter at which mode coupling occurs decreases. This relationship is the same even when the cases of the outer diameter of the core a being 35 μm and 40 μm, for example. FIGS. 9 to 12 are graphs that show the relationship the bending diameter and the $\Gamma$ value when the outer diameter of the core a is fixed to 35 μm, the relative refractive index difference between the core a and the inner cladding b to 0.1%, and the relative refractive index difference between the inner cladding b and the intermediate cladding c to 0.3%, and the outer diameter of the inner cladding b is changed. Also, FIGS. 13 to 16 are graphs that show the relationship the bending diameter and the $\Gamma$ value when the outer diameter of the core a is fixed to 40 μm, the relative refractive index difference between the core a and the inner cladding b to 0.1%, and the relative refractive index difference between the inner cladding b and the intermediate cladding c to 0.3%, and the outer diameter of the inner cladding b is changed. As the outer diameter of the core a increases, as shown in FIGS. 9 to 16, there is a tendency for the bending diameter at which mode coupling occurs to decrease. FIG. 17 is a graph that shows the example of the result of calculating the relationship between the outer diameter of the inner cladding b and the bending diameter at which mode coupling occurs between the axisymmetric mode of a higher order than the fundamental mode in the core a (high-order mode ($LP_{02}$ mode)) and the 1st cladding mode for each outer diameter of the core a. The tendency for the bending diameter at which mode coupling occurs to decrease as the outer diameter of the core a increases is apparent also from FIG. 17.

In an application such as a fiber laser or the like in which the optical fiber 1 is used and that requires a high output power and high beam quality, a large quantity of pumping light power is required. Here, it is assumed that the outer diameter of the clad that guides the pumping light (intermediate cladding c) is required to be 250 μm or more. Under such as condition, the lower limit of the allowable bending diameter of the optical fiber 1 is preferably determined from the allowable upper limit of the probability of mechanical breakage of the optical fiber 1 due to bending stress at the surface of the optical fiber 1. Assuming that the reliability level of the optical fiber 1 is 100 ppm/m/10 years, in an optical fiber made of glass that is ordinarily used (i.e. silica glass), the allowed lower limit of the bending diameter is about 80 mm effectively.

In the case of the lower limit of the bending diameter being 80 mm, the lower limit of the outer diameter of the inner cladding b can be found from FIG. 17. It is evident that the outer diameter of the inner cladding b at which the bending diameter where mode coupling occurs becomes 80 mm is approximately 65 μm when the outer diameter of the core a is 30 μm, approximately 75 μm when the outer diameter of the core a is 35 μm, and approximately 83 μm when the outer diameter of the core a is 40 μm, respectively. That is, the lower limit of the outer diameter of the inner cladding b is proportional to the outer diameter of the core a, being generally two times the outer diameter of the core a. Accordingly, the outer diameter of the inner cladding b is preferably two times or more the outer diameter of the core a.

On the other hand, the outer diameter of the inner cladding b is preferably five times or less the outer diameter of the core a. This is because of there practically being no particular advantage to making the outer diameter of the inner cladding b larger than five times the outer diameter of the core a.

Also, the outer diameter of the inner cladding b is preferably 130 μm or less. The reason for that is explained below.

Detailed investigation of FIGS. 4 to 16 reveals the following:

(1) Focusing on the relationship between the bending diameter and the Γ value in the same cladding mode (for example, the 1st cladding mode), in the case of changing the outer diameter of the core a or the outer diameter of inner cladding b, the smaller the outer diameter of the core a, or the smaller the outer diameter of the inner cladding b, the wider the range of the bending diameter in which the Γ value decreases. Here, "the range of the bending diameter in which the Γ value decreases" refers for example to "the range of the bending diameter in which the Γ value becomes 0.6 or less." The widening of the range of the bending diameter in which the Γ value decreases, as the outer diameter of the core a decreases, can be understood for example from comparing FIG. 5 and FIG. 10. These are the calculation results in the case of the outer diameter of the inner cladding b being the same and the outer diameter of the core a being different, and the widths of the bending diameter in which the Γ value becomes 0.6 or less are approximately 6 mm in FIG. 5 (the width W1 indicated by the arrows in FIG. 5), and approximately 2.5 mm in FIG. 10 (the width W2 indicated by the arrows in FIG. 10) respectively, which are affected by the coupling of the axisymmetric mode of a higher order than the fundamental mode in the core a (high-order mode (LP$_{02}$ mode)) and the 1st cladding mode. On the other hand, the widening of the range of the bending diameter in which the Γ value decreases, as the outer diameter of the inner cladding b decreases, can be understood for example from comparing FIG. 6 and FIG. 7. The widths of the bending diameter in which the Γ value becomes 0.6 or less are approximately 3.5 mm in FIG. 6 (the calculation in the case of the outer diameter of the inner cladding b being 100 μm) (the width W3 indicated by the arrows in FIG. 6), and approximately 2.0 mm in FIG. 7 (the calculation in the case of the outer diameter of the inner cladding b being 110 μm) (the width W4 indicated by the arrows in FIG. 7) respectively, which are affected by the coupling of the LP$_{02}$ mode and the 1st cladding mode.

(2) In the case of the coupling of the axisymmetric mode of a higher order than the fundamental mode in the core a (high-order mode) and the 2nd cladding mode, the range of the bending diameter in which the Γ value decreases is narrow. This can be understood by comparison for example between the width of the bending diameter in which the Γ value becomes 0.6 or less being approximately 2.0 mm (the width W4 indicated by the arrows in FIG. 7) by the coupling of the axisymmetric mode of a higher order than the fundamental mode in the core a (high-order mode (LP$_{02}$ mode)) and the 1st cladding mode in FIG. 7, the width of the bending diameter in which the Γ value becomes 0.6 or less being approximately 1.5 mm (the width W5 indicated by the arrows in FIG. 7) by the coupling of the LP$_{02}$ mode and the 2nd cladding mode, and the width of the bending diameter in which the Γ value becomes 0.6 or less being approximately 6.0 mm (the width W6 indicated by the arrows in FIG. 7) by the coupling of the LP$_{02}$ mode and the 3rd cladding mode.

(3) Coupling of the axisymmetric mode of a higher order than the fundamental mode in the core a (high-order mode) and the high-order cladding mode occurs at the relatively small bending diameter. This for example can be understood from the results that the coupling of the axisymmetric mode of a higher order than the fundamental mode in the core a (high-order mode (LP$_{02}$ mode)) and the 1st cladding mod; the coupling of the LP$_{02}$ mode and the 2nd cladding mode, and the coupling of the LP$_{02}$ mode and the 3rd cladding mode occur in the vicinity of the bending diameters of approximately 180 mm, 140 mm and 120 mm, respectively, in FIG. 7. Also, even in the high-order cladding mode, the smaller the outer diameter of the core a, or the smaller the outer diameter of the inner cladding b, the wider the range of the bending diameter in which the Γ value decreases. The widening of the range of the bending diameter in which the Γ value decreases, as the outer diameter of the core a decreases, can be understood for example from comparing FIG. 7 and FIG. 12 that are the calculation results in the ease of the outer diameter of the inner cladding b being the same and the outer diameter of the core a being different, and the widths of the bending diameter in which the Γ value becomes 0.6 or less are approximately 6.0 mm in FIG. 7 (the width W6 indicated by the arrows in FIG. 7), and approximately 2.5 mm in FIG. 12 (the width W7 indicated by the arrows in FIG. 12) by the couplings of the LP$_{02}$ modes and the 3rd cladding modes. On the other hand, the widening of the range of the bending diameter in which the Γ value decreases, as the outer diameter of the inner cladding decreases, can be understood for example from comparing FIG. 6 and FIG. 7, and the widths of the bending diameter in which the Γ value becomes 0.6 or less are approximately 3.0 mm in FIG. 6 (the width W8 indicated by the arrows in FIG. 6), and approximately 1.5 mm in FIG. 7 (the width W5 indicated by the arrows in FIG. 7) by the coupling of the LP$_{02}$ mode and the 2nd cladding mode.

Here, issues relating to width of the range of the bending diameter in which the Γ value decreases are described.

When fabricating an optical fiber or winding it at a certain diameter, it is necessary to take variations occurring in either case into consideration.

In the case of fabricating an optical fiber, the refractive index profile that is shown as an example in FIG. 3 is no more than an extremely idealized one, and in reality changes in the refractive index at the boundary of each layer are smoother than those in FIG. 3, and for example refractive index change portions that are called "dips" and "horns" may appear in the center of the core. Moreover, these actual refractive index profiles in the optical fiber slightly change even in the longitudinal direction of the optical fiber. Given the aforementioned considerations, the allowable range of the bending diameter in which the desired mode coupling occurs (i.e. Γ value becomes 0.6 or less) should be as wide as possible. Also, in the case of winding the optical fiber, winding it with a completely uniform diameter is difficult in actual due to variations in process and actual restrictions in storage, and so the allowable range of the bending diameter in which the desired mode coupling occurs should be as wide as possible.

It is desired to realize that the allowable range of the bending diameter in which practical mode coupling occurs is 2 mm or more as a width.

At least the following conclusions are obtained from this requirement and the aforementioned (1) to (3).

(a) In the case of utilizing the coupling of the axisymmetric mode of a higher order than the fundamental mode in the core a (high-order mode) and the 1st cladding mode, the upper limit of the outer diameter of the inner cladding b is 110 µm or less for any outer diameter of the core a. When the outer diameter of the inner cladding b exceeds 110 µm, the width of the bending diameter in which the $\Gamma$ value becomes 0.6 or less becomes narrower than 2 mm.

(b) The coupling of the axisymmetric mode of a higher order than the fundamental mode in the core a (high-order mode) and the 2nd cladding mode cannot practically be utilized.

(c) In the case of utilizing the coupling of the axisymmetric mode of a higher order than the fundamental mode in the core a (high-order mode) and the 3rd cladding mode, the upper limit of the outer diameter of the inner cladding b differs depending on the outer diameter of the core a, but is 130 µm or less. When the outer diameter of the inner cladding b exceeds 130 µm, in the mode coupling of the axisymmetric mode of a higher order than the fundamental mode in the core a (high-order mode) and the 3rd cladding mode, the width of the bending diameter in which the $\Gamma$ value becomes 0.6 or less becomes narrower than 2 mm.

From the above viewpoint, in order to utilize coupling of the axisymmetric mode of a higher order than the fundamental mode in the core a (high-order mode) and at least any one of the 1st cladding mode to the 3rd cladding mode, it is preferable that the outer diameter of the inner cladding be 130 µm or less.

In the present invention, it is preferable that the outer diameter of the core a be 25 µm or more. One of the objectives of the present invention is the enlargement of the effective core cross-sectional area. Accordingly, there is no advantage to applying the method of the present embodiment to one with a core a outer diameter that is smaller than 25 µm that could be achieved with the conventional method, as disclosed for example in Non-patent Document 9.

On the other hand, it is preferable that the outer diameter of the core a be 50 µm or less.

From FIG. 4 to FIG. 16 there is seen a tendency for the bending diameter at which mode coupling occurs to decrease, or a tendency for the allowable range of the bending diameter in which mode coupling occurs to become narrow, as the outer diameter of the core a increases in the case of the outer diameter of the inner cladding b being the same. From this, by setting the practical restrictions of making the lower limit of the allowed bending diameter 80 mm and the allowable range of the bending diameter in which mode coupling occurs +/−1 mm or more, an upper limit of the outer diameter of the core a is considered to be some values in the enlargement of the effective core cross-sectional area when applying the method of the present embodiment. When performing calculation with consideration in the case of the coupling of the axisymmetric mode of a higher order than the fundamental mode in the core a (high-order mode) and the 3rd cladding mode, the upper limit of the outer diameter of the core a becomes 50 µm. When the outer diameter of the core a exceeds 50 µm, the allowable range of the bending diameter in which mode coupling occurs between the axisymmetric mode of a higher order than the fundamental mode in the core a (high-order mode) and the 3rd cladding mode (or the 1st cladding mode) becomes narrower than +/−1 mm.

In the present invention, it is preferable for the relative refractive index difference between the core a and the inner cladding b to be 0.13% or less. The reason for that is given below.

Figure 21:
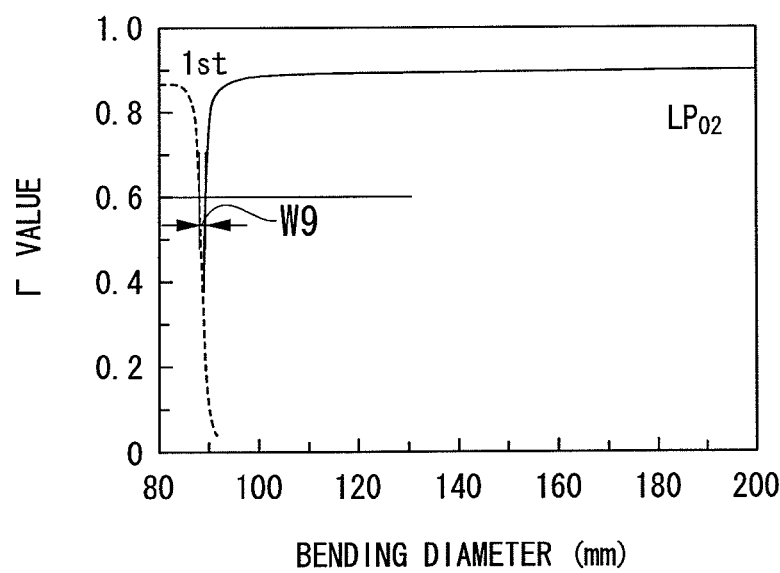
FIG. 21 is a graph that shows the relationship between the Γ value and the bending diameter in the multi-cladding optical fiber according to an embodiment of the present invention in which the relative refractive index difference between the core and the inner cladding is 0.13%.

FIGS. 18 to 21 show the calculation result of the relationship between the $\Gamma$ value and the bending diameter in the case of the relative refractive index difference between the core a and the inner cladding b being changed from 0.10% to 0.13%. Here, note that the parameters other than the relative refractive index difference between the core a and the inner cladding b are the same as the case of the multi-cladding optical fiber 1 that has the refractive index profile shown in FIG. 3B. As the relative refractive index difference between the core a and the inner cladding b increases, the bending diameter in which the mode coupling occurs decreases, or the allowable range of the bending diameter in which mode coupling occurs becomes narrow. This is not desired in the same way as the case of increasing the outer diameter of the core a. Accordingly, there is a limit to the upper limit of the relative refractive index difference between the core a and the inner cladding b due to the allowed bending diameter and the allowable range of the bending diameter in which mode coupling occurs, and that upper limit is approximately 0.13 percent. As shown in FIG. 21, in the case of the relative refractive index difference between the core a and the inner cladding b being 0.13 percent, the width W9 of the bending diameter in which the $\Gamma$ value becomes 0.6 or less is 2 mm (+/−1 mm) by the coupling of the axisymmetric mode of a higher order than the fundamental mode in the core a (high-order mode) and the 1st cladding mode, that is, the allowable range of the bending diameter in which mode coupling occurs is 2 mm. In the case of the relative refractive index difference between the core a and the inner cladding b being greater than 0.13 percent, the allowable range of the bending diameter in which mode coupling occurs is narrower than 2 mm, which is not preferred.

On the other hand, it is preferred that the relative refractive index difference between the core a and the inner cladding b be 0.05% or greater.

The lower limit of the relative refractive index difference between the core a and the inner cladding b is determined by the manufacturing optimization of the optical fiber that can be fabricated stably with maintaining the relative refractive index difference. In the case of manufacturing an optical fiber with the VAD (vapor phase axial deposition) method, the MCVD (modified chemical vapor deposition) method, the PCVD (plasma chemical vapor deposition) method, the OVD (outside vapor deposition) method, and the DND (direct nanoparticle deposition) method, around 0.05% is a lower limit that allows stable manufacturing of the fiber.

In the present invention, it is preferable for the relative refractive index difference between the intermediate cladding c and the inner cladding b to be 0.10% or more. In the case of the relative refractive index difference between the intermediate cladding c and the inner cladding b being between 0.10% and 0.20%, mode coupling occurs between the inner cladding b and the intermediate cladding c. For that reason, it is necessary to include the behavior of the intermediate cladding mode in the calculating a fiber property, and so analyzing the calculated results is complicated. However, if the relative refractive index difference between the intermediate cladding c and the inner cladding b is in the range of 0.10 to 0.20 percent, the calculation becomes complicated, but the effect of the present invention is exhibited. When the relative refractive index difference is less than 0.10%, there is hardly any effect obtained from providing the inner cladding b. Accordingly, the lower limit of the relative refractive index difference between the intermediate cladding c and the inner cladding b is 0.10%.

Moreover, it is more preferable that the relative refractive index difference between the intermediate cladding e and the inner cladding b be greater than 0.20%. When the relative refractive index difference between the intermediate cladding c and the inner cladding b is greater than 0.20%, even if the relative refractive index difference between the intermediate cladding c and the inner cladding b changes, no particular difference appears in the characteristics of an optical fiber, and so the effect of the present invention is exhibited, and moreover the design of an optical fiber is simplified.

Next, the bending conditions during use of the multi-cladding optical fiber 1 of the present embodiment are described below.

The lower limit of the bending diameter is determined from brittle fracture of optical fiber material as mentioned above, and is set to 80 mm.

On the other hand, the upper limit of the bending diameter is preferably 200 mm or less. As is clear from FIG. 4 to FIG. 21, the occurrence of coupling that has a bending diameter allowable width that is actually usable is the region until 200 mm. Also, when usability is considered, a large bending diameter is not preferred on the point of the installation space efficiency.

Given the above, it is preferred to use the multi-cladding optical fiber 1 of the present embodiment that is wound with a bending diameter in the range of 80 to 200 mm.

Next, a more practical embodiment is described, classifying the situations of the high-order mode to be removed.

In the case of only the $LP_{02}$ mode existing in the core as the axisymmetric high-order mode of the core to be removed, by using the coupling of the axisymmetric mode of a higher order than the fundamental mode in the core a (high-order mode) and the cladding mode previously described, the $LP_{02}$ mode can be dispersed in the clad e and removed from the core a.

In the case of the outer diameter of the core a being 35 to 50 μm, the relative refractive index difference between the core a and the inner cladding b is preferably in the range of 0.05 to 0.10 percent. The reason for that is described below When considering the refractive index structure of an optical fiber that has no axisymmetric high-order modes except for the $LP_{02}$ mode, the number of modes in a simple step index core is mostly determined by the outer diameter of the core and the relative refractive index difference between the core and the inner cladding (for example, refer to Non-patent Document 9). Generally in order to reduce the number of modes in the case of the outer diameter of the core being large, it is necessary to for the relative refractive index difference between the core and the inner cladding to be small. As shown in FIGS. 9 to 16, when the outer diameter of the core a is 35 μm in the case of the refractive index difference between the core a and the inner cladding b being 0.10%, there is no $LP_{03}$ mode, but when the outer diameter of the core a is 40 μm, an $LP_{03}$ mode exists when the outer diameter of the inner cladding b is 90 μm and 100 μm (although the Γ value is extremely small). Accordingly, in the case of the outer diameter of the core being large, specifically, in the case of the outer diameter of the core being in the range of 35 to 50 μm, the relative refractive index difference between the core and the inner cladding is preferably in the range of 0.05 to 0.10%. When the relative refractive index difference exceeds 0.10%, the number of axisymmetric modes of a higher order than the fundamental mode in the core a that must be removed (high-order modes) increases.

On the other hand, in the case of the outer diameter of the core being in the range of 25 to 35 μm, the relative refractive index difference between the core a and the inner cladding b is preferably 0.07 to 0.13%. The reason for that is given below In the case of the outer diameter of the core a being small, specifically in the case of the outer diameter of the core a being in the range of 25 to 35 μm, even if the relative refractive index difference between the core a and the inner cladding b can be set large compared to the case of the outer diameter of the core a being large, an upper limit is allowed up to 0.13% without any problem (with no increase in the number of axisymmetric modes of a higher order than the fundamental mode in the core a that must be removed (high-order modes)). On the other hand, in the case of the outer diameter of the core a being small, and the relative refractive index difference between the core a and the inner cladding b being small, specifically, in the case of being smaller than 0.07%, for example, since single-mode propagation can be realized by a method that removes the high-order modes with the bending loss as the optical fiber disclosed in Non-patent Document 9, there is no advantage to applying the method of the present embodiment. Accordingly, in the case of the outer diameter of the core a being small, specifically, in the case of the outer diameter of the core a being in the range of 25 to 35 μm, it is preferable for the relative refractive index difference between the core a and the inner cladding b to be 0.07 to 0.13%.

The case of existing the two modes of the $LP_{02}$ mode and the $LP_{03}$ mode, as axisymmetric modes that should be removed, is as follows.

First, in the case of the outer diameter of the core a being smaller than 35 μm, when considering the object of enlarging the effective core cross-sectional area, there is no advantage to adopting the design of the refractive index profile in which the $LP_{03}$ mode exists (that is, the object is sufficiently attained with a refractive index in which only the $LP_{02}$ mode exists).

On the other hand, in the case of the outer diameter of the core a being 35 to 50 μm, and the relative refractive index difference between the core a and the inner cladding b being 0.08 to 0.13%, the $LP_{03}$ mode exists, and moreover an axisymmetric mode that is of a higher order than the $LP_{03}$ mode does not exist. In the case of an $LP_{03}$ mode existing, since the $LP_{02}$ mode and the $LP_{03}$ mode exist as unnecessary axisymmetric modes, it is necessary to remove both of these modes.

The two following methods can be illustrated as methods of removing these modes.

The first method includes a method of removing both the $LP_{02}$ mode and the $LP_{03}$ mode by the method of the present embodiment, that is, by coupling of axisymmetric modes that is of a higher order than the fundamental mode in the core a (high-order mode) and the cladding mode. However, for example as is evident from FIG. 13, since the bending diameter of coupling with the cladding mode generally differs for the $LP_{02}$ mode and the $LP_{03}$ mode, removing both modes in a certain bending diameter by the method of the present embodiment is ordinarily difficult.

The second method includes a method of removing the $LP_{02}$ mode by causing it to be dispersed in the clad e by coupling with the cladding mode (i.e. the method of the present embodiment), and removing the $LP_{03}$ mode by causing it to be dispersed in the clad e by utilizing the bending loss as disclosed in Non-patent Document 9. Although evident to a person skilled in the art, since the confining of light to the core a becomes weaker as higher high-order modes, the bending loss at the same wavelength and bending diameter becomes greater in a higher-order mode. This is clear for example from the Γ value of the $LP_{03}$ mode being small in FIG. 13. When this property is utilized, it is possible to remove the $LP_{03}$ mode at a larger bending diameter than that disclosed in Non-patent Document 9, and it is possible to remove it without being influenced by deformation of the mode shape of the $LP_{01}$ mode by bending. Also, by setting the bending diameter to the bending diameter in which the $LP_{02}$ mode couples with the cladding mode, it becomes possible to also remove the $LP_{02}$ mode, and it is possible to substantially realize single-mode propagation. Note that since the bending loss of the $LP_{03}$ mode monotonically increases as the bending diameter is reduced, the bending diameter for $LP_{03}$ mode removal can be set in a comparatively wide range. For that reason, since removing $LP_{03}$ mode does not exert a noticeable effect on the setting of the bending diameter for removal of the $LP_{02}$ mode, it is possible to achieve removal of both $LP02$ mode and $LP_{03}$ mode simultaneously and comparatively easily. Such conditions can be realized when the bending diameter is 80 to 200 mm.

In this way, in the case of a method that removes the $LP_{02}$ mode by dispersing it in the clad e by coupling the $LP_{02}$ mode with the cladding mode, and removes the $LP_{03}$ mode by dispersing it in the clad e utilizing the bending loss as disclosed in Non-patent Document 9, and in the case of the core diameter being in the range of 35 to 50 μm, it is preferable that the relative refractive index difference be 0.08 to 0.13%.

In the case of there being $LP_{04}$ and higher modes, it is preferable that the core diameter be 50 μm or less, and it is preferable that the relative refractive index difference between the core and the inner cladding be 0.13% or less.

In the case of there being $LP_{04}$ and higher modes, compared to the examples shown in FIGS. 6 to 16, the outer diameter of the core is larger, and the relative refractive index difference of the core increases, and in this case, the bending diameter at which coupling between the $LP_{02}$ mode and the cladding mode occurs is 80 mm or less. Then, in the case of applying the method of the present embodiment, it is necessary to remove the $LP_{02}$ mode at the bending diameter of 80 mm. As stated above, the larger the outer diameter of the core, and the larger the relative refractive index difference between the core and the inner cladding, the smaller the bending diameter of the optical fiber 1 that is required for removing the $LP_{02}$ mode. Accordingly, practically the upper limit of the outer diameter of the core is 50 μm, and the upper limit of the relative refractive index difference between the core and the inner cladding is limited to about 0.13%. That is, as the outer diameter of the core becomes larger than 50 μm, the bending diameter required for removing the $LP_{02}$ mode becomes smaller than 80 mm, and there is a risk of no longer satisfying the aforementioned reliability level of the optical fiber 1. Similarly, in the case of the relative refractive index difference between the core and the inner cladding exceeding 0.13%, the bending diameter that required for removing the $LP_{02}$ mode becomes smaller than 80 mm, and so there is a similar risk, The multi-cladding optical fiber 1 of the present embodiment is not limited to the above, and for example the periphery of the intermediate cladding c that guides the pumping light may be formed into a polygonal cladding shapes or D-shape cladding in order to avoid a skew light. The energy efficiency of a fiber laser or fiber amplifier that is provided with such an optical fiber is high, and so is more preferred.

Also, it is preferable to coat the outer cladding d of the multi-cladding optical fiber 1 of the present embodiment with a protective coating layer. The protective coating layer may be one that is publicly known, and for example can be formed by using a UV-cured resin or a silicone resin. Moreover, the protective coating layer may consist of a plurality of layers each having a different Young's modulus, and it may have a colored layer.

Moreover, it is preferable to be able to use as the optical amplification medium that in which luminescent material such as ytterbium and erbium were added to the core a. Examples of luminescent materials include rare earth elements, bismuth, chromium and the like. Examples of preferable rare earth elements include holmium, thulium, terbium, neodymium and praseodymium, as well as erbium and ytterbium being more preferable. In particular, since upconversion does not take place in one in which ytterbium has been added, an extremely high power output light can be obtained, and the effect of the present invention is demonstrated most notably in which ytterbium has been added.

The multi-cladding optical fiber 1 of the present embodiment can be manufactured by a publicly known method such as the MCVD method and the VAD method. The adoption of any method can be suitably decided in accordance with the aim of usage of the optical fiber 1.

The points of difference between the multi-cladding optical fiber 1 of the present embodiment and a publicly known triple-clad optical fiber are as follows.

The specification of U.S. Pat. No. 6,941,053 discloses a triple-clad optical fiber. However, this optical fiber differs from the present invention on the point of the core being single mode, and moreover it makes no disclosure regarding the specific fiber structure, use while bent, and removal of high-order modes.

The specification of Japanese Patent No. 3298799 also discloses an optical fiber that is provided with a triple-layer cladding. However, since it is directed to different subject matter than the present invention, the ratio of the outer diameter of the core and the outer diameter of the inner cladding significantly differs from that of the present embodiment, and the outer diameter of the core also differs. Also, since the cross-sectional shape in the radial direction of the innermost cladding is non-axisymmetric, the effect that is exhibited differs depending on the radial direction of bending the optical fiber, and so it is not possible to stably obtain the effect of the present invention.

The specification of U.S. Pat. No. 7,050,686 also discloses an optical fiber with a triple-layer cladding, However, it is directed to a different subject matter than the present invention, and it is only takes as its subject matter lowering the relative refractive index difference between the inner portion and the core. The subject matter of the present invention is not present, and a specific structure is not disclosed, for example, no disclosure is made at all regarding the configuration required for coupling between the core mode and the cladding mode, and use in a bent state is not disclosed either. The core diameter that is disclosed in the embodiment is 20 μm, which differs from the present invention.

<Optical Fiber Module>

In the optical fiber module of the present embodiment, the aforementioned multi-cladding optical fiber 1 of the present embodiment is wound. The optical fiber module can be manufactured by the same method as the case of a publicly known optical fiber module, other than using the multi-cladding optical fiber 1 of the present embodiment.

The multi-cladding optical fiber 1 is preferably wound at a bending diameter of 80 to 200 mm.

<Fiber Laser, Fiber Amplifier>

The fiber laser or the fiber amplifier of the present embodiment has the aforementioned multi-cladding optical fiber 1 of the present embodiment or the aforementioned optical fiber module of the present embodiment. The fiber laser or the fiber amplifier can be manufactured by the same method as the case of a publicly known fiber laser or fiber amplifier, other than using the multi-cladding optical fiber 1 or the optical fiber module of the present embodiment.

The multi-cladding optical fiber 1 of the present embodiment has a simple structure, and substantial single-mode propagation and enlargement of the effective core cross-sectional area are possible. Specifically, bending at a predetermined bending diameter enlarges the effective core cross-sectional area while maintaining single-mode propagation. The occurrence of optical damage and nonlinear optical effects is suppressed, and the endurance (robustness?) to high-power light is excellent, so it is particularly suited to the transmission of high power light. An optical fiber module, fiber laser and fiber amplifier that has the multi-cladding optical fiber 1 can output signal light by amplification or laser oscillation by stimulated emission through pumping light that is guided to the optical fiber.

EXAMPLES

Hereinafter, the present invention is described in greater detail with specific examples. Note that the present invention is not limited in any way to the following examples.

Example 1

Figure 3B:
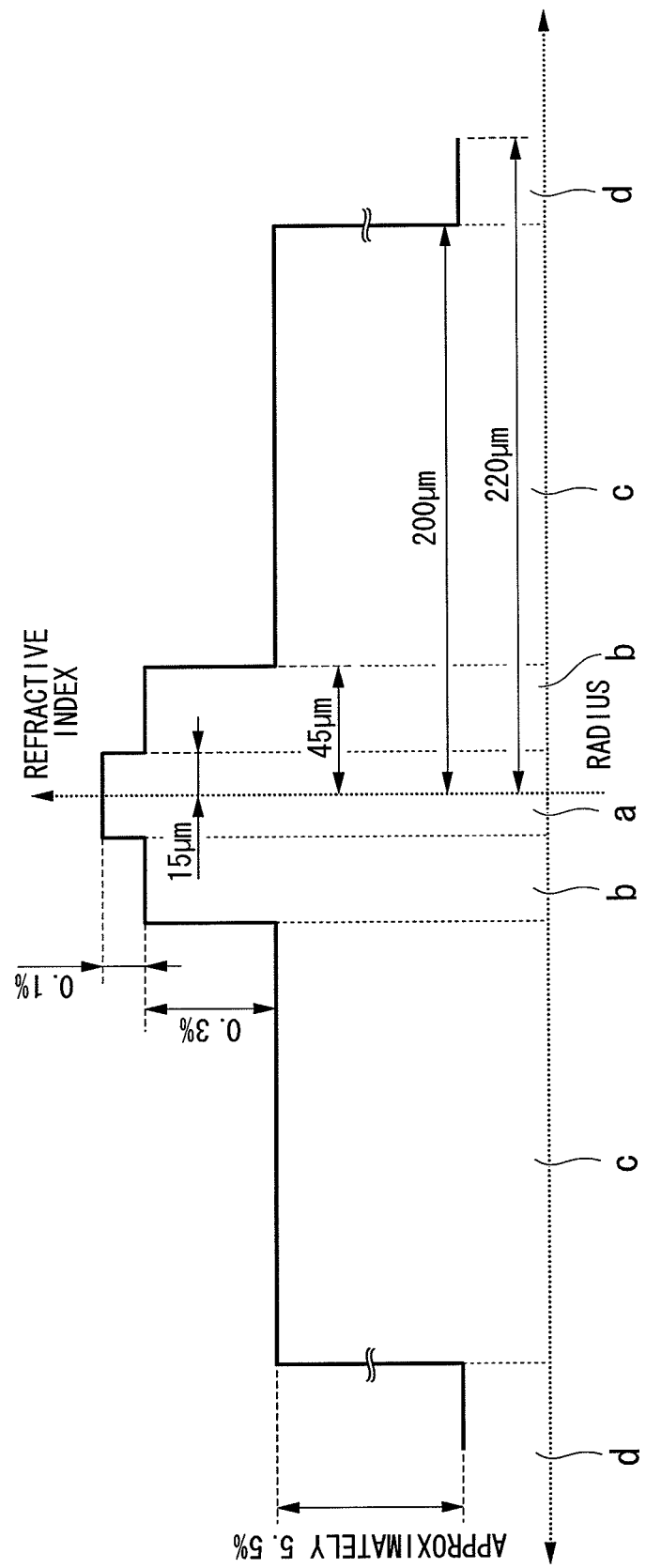
FIG. 3B is a view that illustrates an example of the refractive index profile in the multi-cladding optical fiber according to an embodiment of the present invention.
Figure 4:
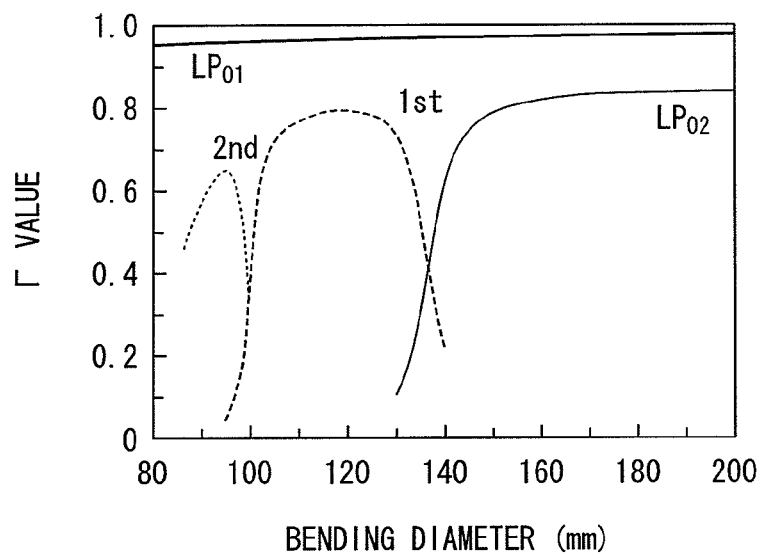
FIG. 4 is a graph that shows the relationship between the Γ value and the bending diameter in the multi-cladding optical fiber that has the refractive index profile shown in FIG. 3B.
Figure 5:
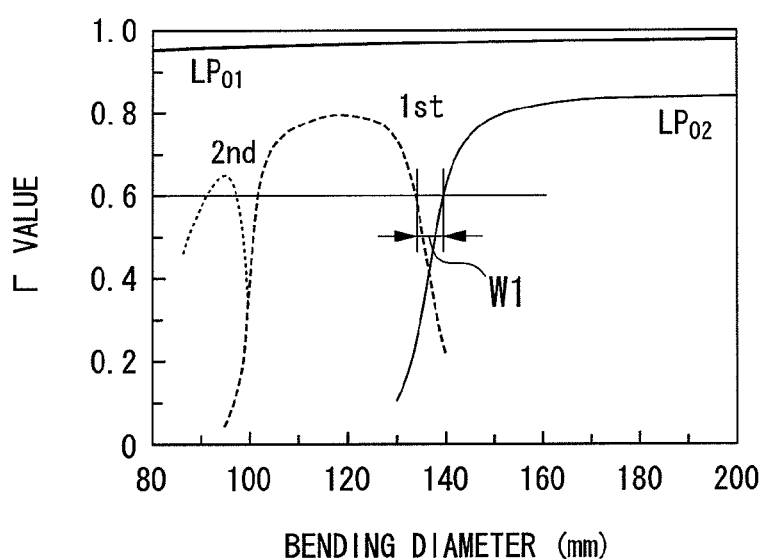
FIG. 5 is a graph that shows the relationship between the Γ value and the bending diameter in the multi-cladding optical fiber according to an embodiment of the present invention in the case of the outer diameter of the core being 30 μm and the outer diameter of the inner cladding being 90 μm.
Figure 6:
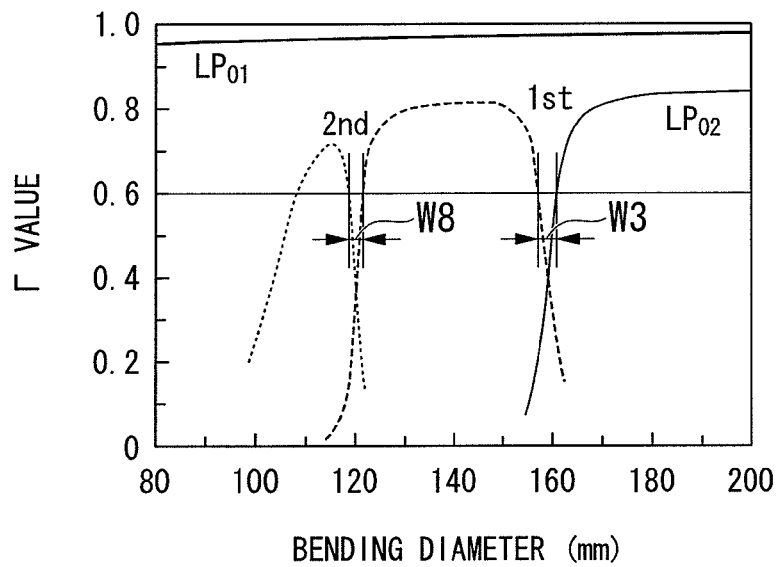
FIG. 6 is a graph that shows the relationship between the Γ value and the bending diameter in the multi-cladding optical fiber according to an embodiment of the present invention in the case of the outer diameter of the core being 30 μm and the outer diameter of the inner cladding being 100 μm.
Figure 7:
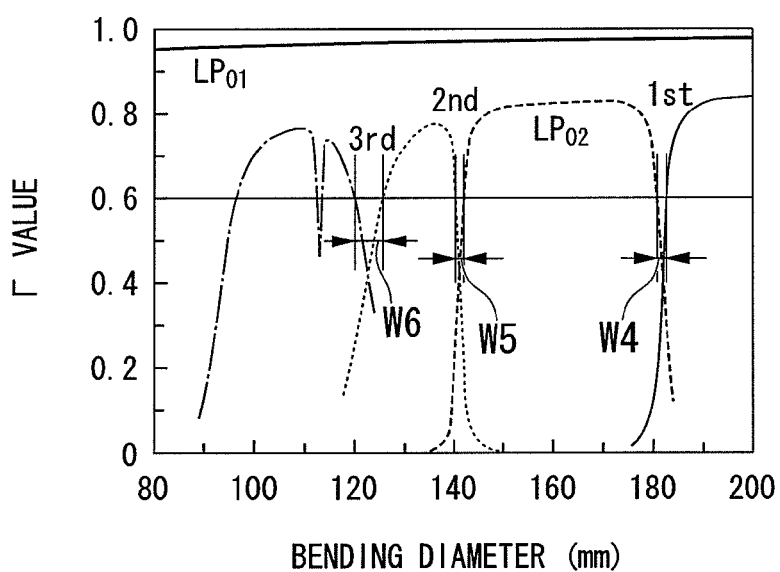
FIG. 7 is a graph that shows the relationship between the Γ value and the bending diameter in the multi-cladding optical fiber according to an embodiment of the present invention in the case of the outer diameter of the core being 30 μm and the outer diameter of the inner cladding being 110 μm.
Figure 8:
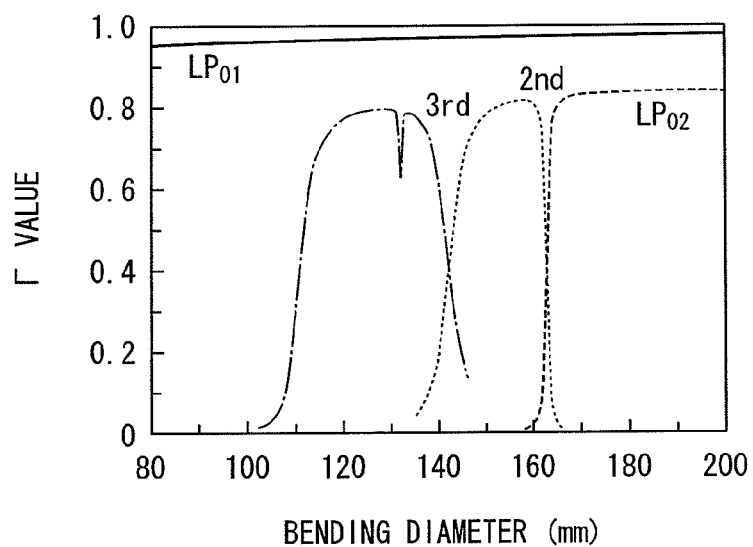
FIG. 8 is a graph that shows the relationship between the r value and the bending diameter in the multi-cladding optical fiber according to an embodiment of the present invention in the case of the outer diameter of the core being 30 μm and the outer diameter of the inner cladding being 120 μm.
Figure 9:
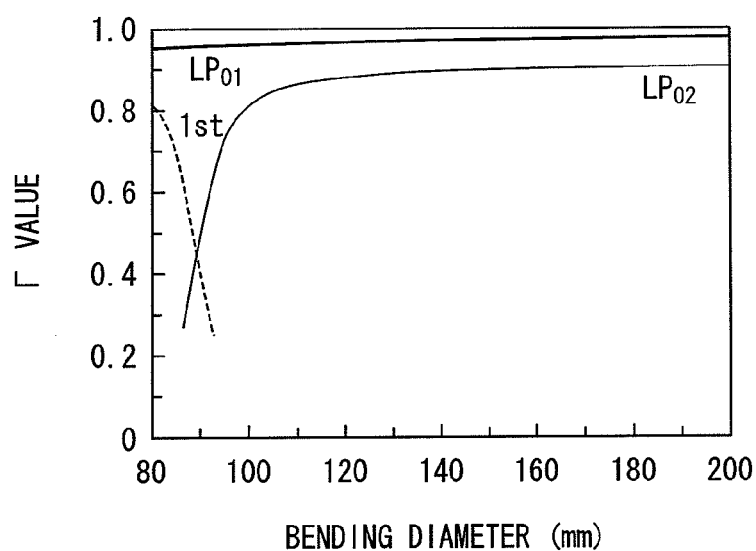
FIG. 9 is a graph that shows the relationship between the r value and the bending diameter in the multi-cladding optical fiber according to an embodiment of the present invention in the case of the outer diameter of the core being 35 μm and the outer diameter of the inner cladding being 80 μm.
Figure 10:
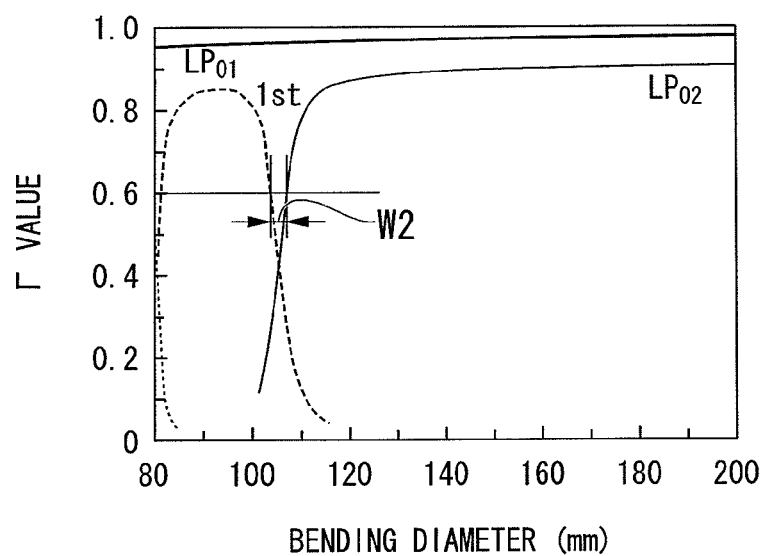
FIG. 10 is a graph that shows the relationship between the Γ value and the bending diameter in the multi-cladding optical fiber according to an embodiment of the present invention in the case of the outer diameter of the core being 35 μm and the outer diameter of the inner cladding being 90 μm.
Figure 11:
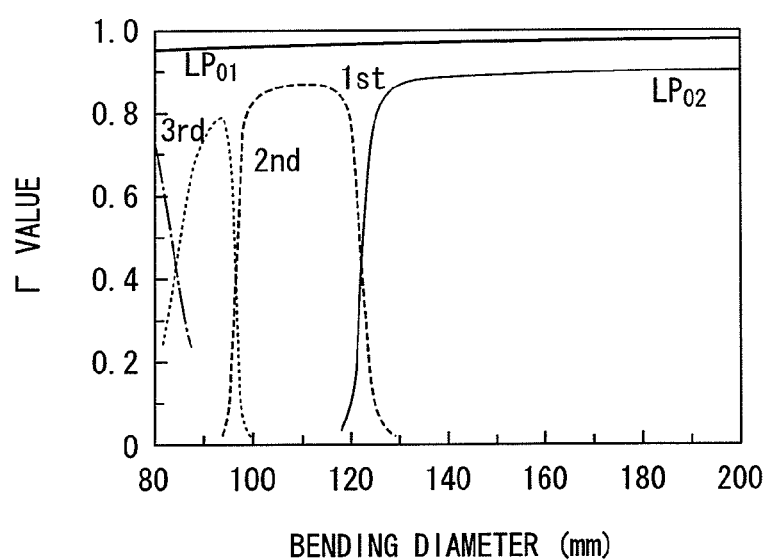
FIG. 11 is a graph that shows the relationship between the Γ value and the bending diameter in the multi-cladding optical fiber according to an embodiment of the present invention in the case of the outer diameter of the core being 35 μm and the outer diameter of the inner cladding being 100 μm.
Figure 12:
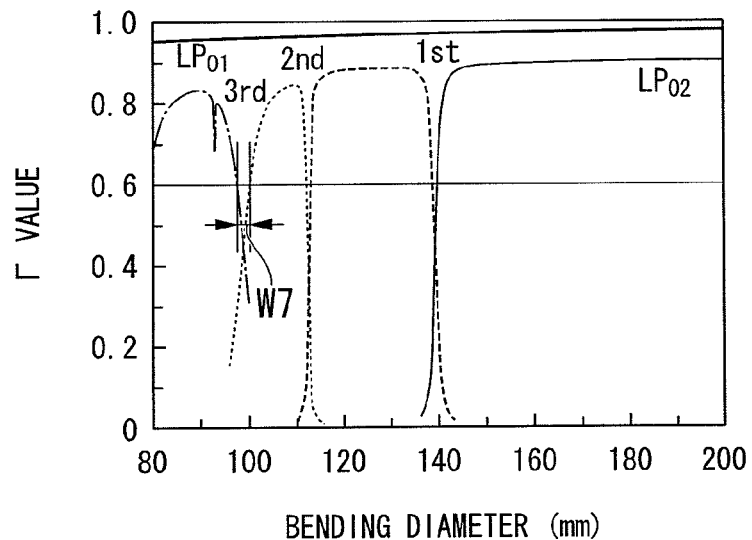
FIG. 12 is a graph that shows the relationship between the Γ value and the bending diameter in the multi-cladding optical fiber according to an embodiment of the present invention in the case of the outer diameter of the core being 35 μm and the outer diameter of the inner cladding being 110 μm.
Figure 13:
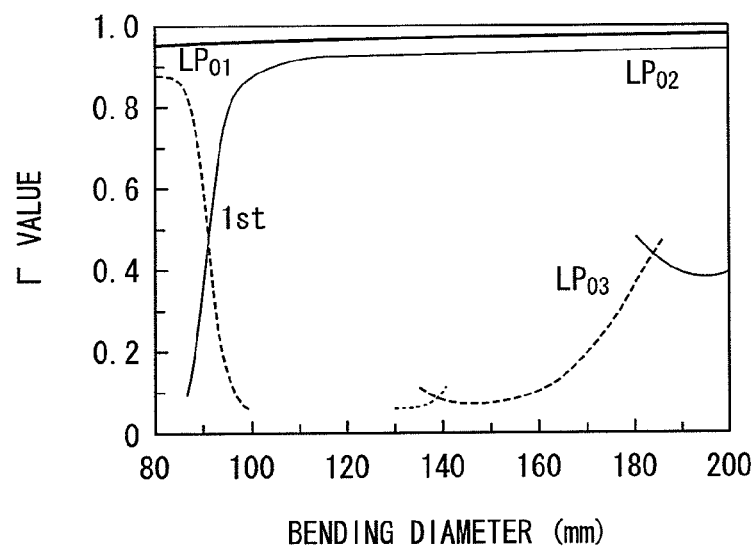
FIG. 13 is a graph that shows the relationship between the Γ value and the bending diameter in the multi-cladding optical fiber according to an embodiment of the present invention in the case of the outer diameter of the core being 40 μm and the outer diameter of the inner cladding being 90 μm.
Figure 14:
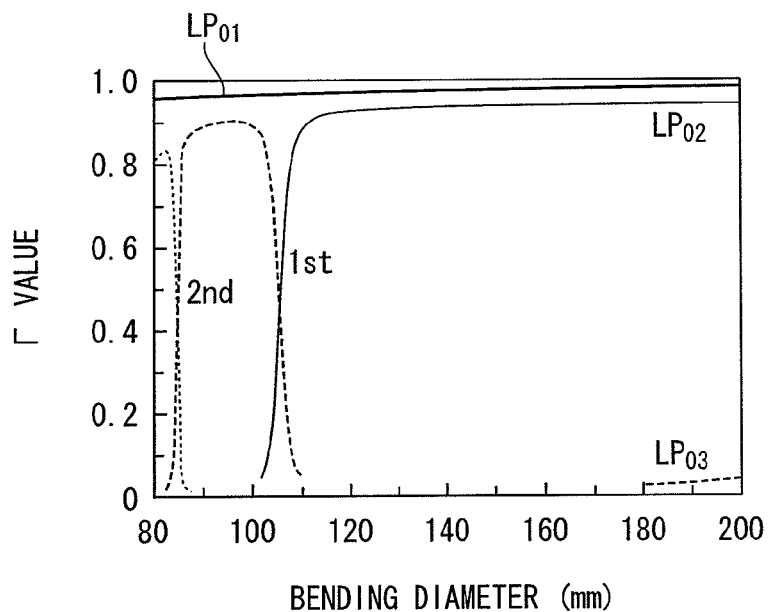
FIG. 14 is a graph that shows the relationship between the Γ value and the bending diameter in the multi-cladding optical fiber according to an embodiment of the present invention in the case of the outer diameter of the core being 40 μm and the outer diameter of the inner cladding being 100 μm.
Figure 15:
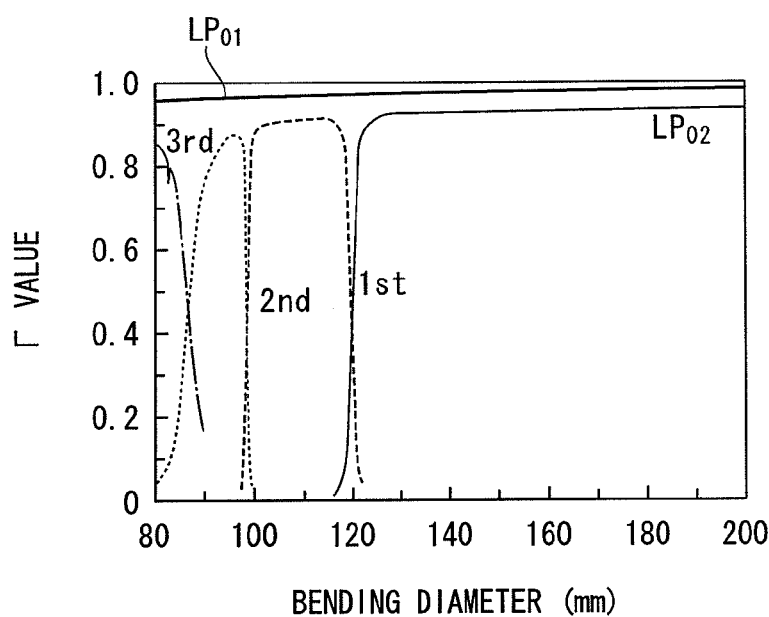
FIG. 15 is a graph that shows the relationship between the Γ value and the bending diameter in the multi-cladding optical fiber according to an embodiment of the present invention in the case of the outer diameter of the core being 40 μm and the outer diameter of the inner cladding being 110 μm.
Figure 16:
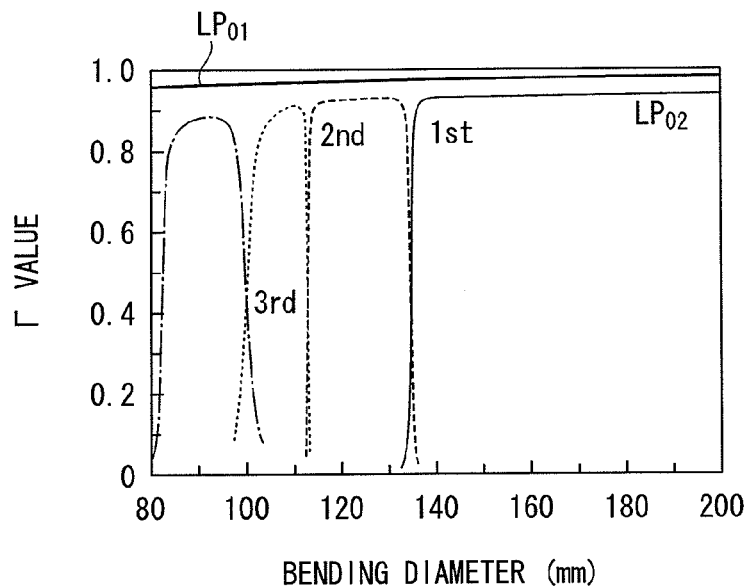
FIG. 16 is a graph that shows the relationship between the value and the bending diameter in the multi-cladding optical fiber according to an embodiment of the present invention in the case of the outer diameter of the core being 40 μm and the outer diameter of the inner cladding being 120 μm.

An optical fiber having the refractive index profile and outer diameter as shown in FIG. 3B was manufactured.

Figure 23:
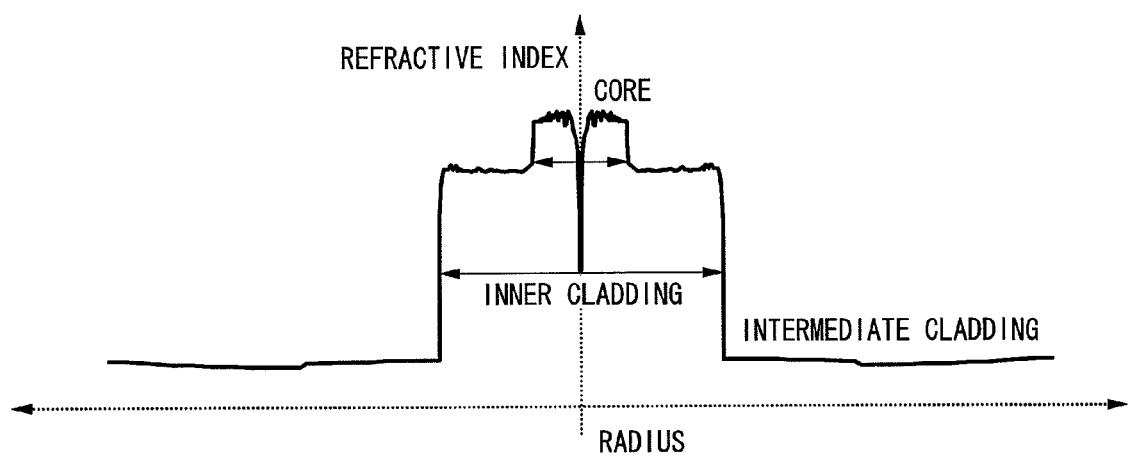
FIG. 23 is a graph that shows the refractive index profile of the core, inner cladding, and intermediate cladding of the optical fiber after collapsing process in Example 1.

First, the core and the inner cladding were manufactured by the MCVD method. A starting silica tube is heated, with an oxy-hydrogen flame from the outer side serving as the heat source, and tetrachlorosilane, a germanium tetrachloride, oxygen, and helium are supplied to inside the tube and reacted, and an inner cladding and core that consist of a layer of germanium-doped silica glass having the desired refractive index are formed on the inner wall surface of the start silica tube. The relative refractive index difference between the core, the inner cladding, and the intermediate cladding (start silica tube) is adjusted by the germanium doping amount of the core and the inner cladding. Afterward, the outer side of the tube is heated with an oxyhydrogen flame serving as the heart source in the same manner as describe above, and collapsed to be solidified while introducing oxygen. The refractive index profile is shown in FIG. 23. The ratio of the outer diameter of the core and the outer diameter of the inner cladding (outer diameter of core: outer diameter of inner cladding) is approximately 1:3, and so the desired refractive index profile is obtained.

Next, glass of the intermediate cladding is added by an outer vapor-phase deposition (OVD) step so that the ratio of the outer diameter of the intermediate cladding and the outer diameter of the core (outer diameter of intermediate cladding: outer diameter of core) becomes the desired value (1:13.3), and then drawn so that the outer diameter of the fiber becomes 400 μm. At this time, a polymer material with a low refractive index (for example, OP-38Z, manufactured by DIC Corporation) is coated on the outer periphery of the glass, and by curing with UV light, the outer cladding is formed.

Moreover, by coating the outer periphery with a UV-cured resin that is a protective material and curing by irradiating UV light, a protective coating layer is formed.

As a result of measuring the refractive index profile of the manufactured fiber by the refractive near field pattern (RNFP) method, it could be confirmed that the optical fiber that is manufactured as above has the desired refractive index profile as basically shown in FIG. 3B. The bending diameter dependence of core-transmitted light at a wavelength of 1064 nm was measured using 2 meters of the optical fiber. Reduction in the core-transmitted light was observed at bending diameters of around 150 mm and 105 mm as designed, and as envisaged it could be confirmed that an axisymmetric mode of a higher order than the fundamental mode being transmitted through the core (high-order mode) selectively leaks to outside the core by the bending at bending diameters of around 150 mm and 105 mm.

Also, the effective core cross-sectional area became 420 $\mu m^2$ at the bending diameter that serves as the effective single mode condition, by making the outer diameter of the core 30 μm. Accordingly, it was possible to enlarge by approximately 30% the effective core cross-sectional area compared to the upper limit of 320 $\mu m^2$ of the effective cross cross-sectional area in the bending diameter that serves as the effective single mode condition according to the conventional method, as disclosed in Non-patent Document 9.

Example 2

An optical fiber was manufactured having the same refractive index profile and outer diameter as Example 1.

After forming the inner cladding on the inside wall surface of the starting silica tube by the same method as Example 1, deposition of the core portion is performed and a porous glass layer is formed. Next, by immersing the interior of the tube in a mixed aqueous solution of aluminum chloride and ytterbium chloride for several hours and then drying it, aluminum and ytterbium that are the dopants of the core are introduced, and while thereafter introducing oxygen., helium and thionyl chloride in the tube, sintering (transparentizing) with a induction heating furnace as a heat source and collapsing were performed to solidify it. At this time, the relative refractive index difference between the core and the inner cladding becomes the desired value by adjusting the doping of aluminum and ytterbium.

Next, the ratio of the outer diameter of the intermediate cladding and the outer diameter of the core was adjusted with the rod-in-tube method, after which drawing, the formation of the outer cladding, and the formation of the protective coating layer were performed as Example 1. Note that the ratio of the outer diameter of the core and the outer diameter of the inner cladding, and the ratio of the outer diameter of the intermediate cladding and the outer diameter of the core are the same as those of Example 1.

The optical fiber manufactured as above was made into a module (coiled) by winding approximately 15 meters on a metallic reel with a bending diameter of approximately 140 mm, and next making a fiber amplifier, and confirming the beam profile of the optical output as a fiber amplifier, it could be confirmed that it has a beam quality ($M^2$) of approximately 1.1, and has a mode distribution of mostly the fundamental mode.

Example 3

An optical fiber was manufactured having the same refractive index profile and outer diameter as Example 1.

First, the core and the inner cladding were formed by the VAD method. The core was formed with germanium-doped silica glass, and the inner cladding was formed with =doped silica glass.

Next, the intermediate cladding was formed by the outer vapor-phase deposition method. At the time, during sintering of the outer vapor-phase deposited portion, helium and silicon tetrafluoride are injected to make the refractive index lower than the inner cladding.

Next, similarly to the case of Example 1, drawing, the formation of the outer cladding, and the formation of the protective coating layer were performed. Note that the ratio of the outer diameter of the core and the outer diameter of the inner cladding, and the ratio of the outer diameter of the intermediate cladding and the outer diameter of the core are the same as those of Example 1.

For the optical fiber manufactured as above, when the bending diameter dependence of the core transmitted light was measured, approximately the same characteristics as Example 1 were obtained.

Example 4

After forming the inner cladding on the inside wall surface of the starting silica tube by the same method as Example 1, deposition of the core portion is performed and a porous glass layer is formed. At this time, an induction heating furnace was used as a heat source and aluminum chloride was introduced to the tube in a gas phase as a dopant. Next, after immersing the interior of the tube in an ytterbium chloride aqueous solution for several hours, it was dried, and sintering with an oxy-hydrogen flame and collapsing were performed to solidify it. Note that the sintering was performed while introducing phosphorus oxychloride into the tube in a gas phase. As a result of the above operations, the refractive index difference between the core and the inner cladding can be adjusted by adjusting the concentration of the germanium in the inner cladding, and the respective concentrations of the aluminum, phosphorous and ytterbium in the core.

Next, after adjusting the ratio of the intermediate cladding diameter and the core diameter, the outer surface of the intermediate cladding is grinded so that the cross-sectional shape in the radial direction has an approximate heptagonal shape. Next, similarly to the case of Example 1, drawing, the formation of the outer cladding, and the formation of the protective coating layer were performed.

In the optical fiber that is manufactured in the above manner, the outer diameter of the core is approximately 35 µm, the relative refractive index difference between the core and the inner cladding is 0.09%, the outer diameter of the inner cladding is approximately 110 µm, the relative refractive index difference between the inner cladding and the intermediate cladding is 0.32%, the inscribed circle outer diameter of the intermediate cladding is approximately 375 µm, the outer diameter of the outer cladding is approximately 420 µm, and the refractive index of the outer cladding is 1.376 (the relative refractive index difference between the intermediate cladding and the outer cladding is approximately 5.5%). The optical fiber is modularized (coiled) by housing approximately 10 meters of it in a tray with a metallic groove having a coiling diameter of approximately 90 mm, and next making a fiber amplifier, and confirming the beam profile of the optical output as a fiber laser, it could be confirmed that it has a beam quality ($M^2$) of approximately 1.2, and a mode distribution in which the fundamental mode mostly exists. Note that when laser oscillation is performed with a bending diameter of approximately 130 mm, a result is obtained that is estimated the beam quality to be 2 or more, and a high-order mode exists. The effective core cross-sectional area was 580 µm² at the bending diameter that serves as the effective single mode condition by making the outer diameter of the core 35 µm in the aforementioned fiber that was manufactured. Accordingly, it was possible to enlarge by approximately 80% the effective core cross-sectional area compared to the upper limit of 320 µm² of the effective cross cross-sectional area in the bending diameter that serves as the effective single mode condition according to the conventional method as disclosed in Non-patent Document 9.

Example 5

By the same method as the case of Example 1, an optical fiber was manufactured by adjusting the manufacturing parameters so that the outer diameter of the core is 45 µm, the outer diameter of the inner cladding is 120 µm, the relative refractive index difference between the core and the inner cladding is 0.10%, the outer diameter of the intermediate cladding is 400 um, the relative refractive index difference between the inner cladding and the intermediate cladding is 0.3%, the outer diameter of the outer cladding is 440 µm, and the refractive index of the outer cladding is 1.376 (the relative refractive index difference between the intermediate cladding and the outer cladding is 5.5%).

When the bending diameter dependence of core transmitted light at a wavelength of 1064 nm was measured using 2 meters of the optical fiber, a reduction in the core transmitted light was observed at bending diameters of around 180 mm and 120 mm at which diameters were approximately as designed, and as envisaged it could be confirmed that an axisymmetric mode of a higher order than the fundamental mode being transmitted through the core (high-order mode) selectively leaks to outside the core by the bending. The effective core cross-sectional area became 800 µm² at the bending diameter that serves as the effective single mode condition by making the outer diameter of the core 45 µm in the aforementioned optical fiber that was manufactured. Accordingly, it was possible to enlarge by approximately 2.5 times the effective core cross-sectional area compared to the upper limit of 320 µm² of the effective cross-sectional area in the bending diameter that serves as the effective single mode condition according to the conventional method, as disclosed in Non-patent Document 9.

The multi-cladding optical fiber of the present embodiment can be used various transmission media for high power light, such as a laser medium for a high power light source in materials machining applications such as welding, marking and cutting.

What is claimed is:

1. A multi-cladding optical fiber comprising: a core with an average refractive index $n1$ that guides a signal light; and a cladding comprising an inner cladding with an average refractive index $n2$ that is formed on the periphery of the core, an intermediate cladding with an average refractive index $n3$ that is formed on the periphery of the inner cladding, and outer cladding with an average refractive index $n4$ that is formed on the periphery of the intermediate cladding to confine a pumping light to the intermediate cladding or the inner cladding: wherein the refractive indices $n1$ to $n4$ satisfy the relationship of $N1>n2>n3>n4$; two or more axisymmetric modes exist in the core at a wavelength of the signal light; the two or more axisymmetric modes include a fundamental mode and at least a high-order mode that is an axisymmetric mode of a higher order than the fundamental mode and when bent at a predetermined bending diameter the high-order mode in the core disperses within the inner cladding due to coupling with the inner cladding mode, so that only the fundamental mode substantially propagates in the core through the fiber wherein the outer diameter of the inner cladding is two to five times the outer diameter of the core, and 130 µm or less, wherein the outer diameter core is 25-50 µm; and the relative refractive index difference between the core and the inner cladding is .05 to 0.13%.

2. The multi-cladding optical fiber according to claim 1, wherein the multi-cladding optical fiber is bent at a predetermined bending diameter.

3. The multi-cladding optical fiber according to claim 1, wherein only an $LP_{01}$ mode and an $LP_{02}$ mode that is of a higher order than the $LP_{01}$ mode exist as the axisymmetric modes, and higher order modes equal to or greater than an $LP_{03}$ mode that is the lowest higher order mode than the $LP_{02}$ mode does not exist.

4. The multi-cladding optical fiber according to claim 3, wherein the outer diameter of the inner cladding is two to five times the outer diameter of the core, and 130 μm or less.

5. The multi-cladding optical fiber according to claim 4, wherein the outer diameter of the core is 35 to 50 μm, and the relative refractive index difference between the core and the inner cladding is 0.05 to 0.10%.

6. The multi-cladding optical fiber according to claim 4, wherein the outer diameter of the core being 25 to 35 μm, and the relative refractive index difference between the core and the inner cladding is 0.07 to 0.13%.

7. The multi-cladding optical fiber according to claim 1, wherein only an $LP_{01}$ mode, an $LP_{02}$ mode that is of a higher order than the $LP_{01}$ mode, and an $LP_{03}$ mode that is of a higher order than the $LP_{02}$ mode exist as the axisymmetric modes, and the $LP_{02}$ mode disperses within the inner cladding due to coupling with an inner cladding mode, and the $LP_{03}$ mode disperses within the inner cladding by bending loss.

8. The multi-cladding optical fiber according to claim 7, wherein the outer diameter of the inner cladding is two to five times the outer diameter of the core, and 130 μm or less.

9. The multi-cladding optical fiber according to claim 8, wherein the outer diameter of the core being 35 to 50 μm, and the relative refractive index difference between the core and the inner cladding is 0.08 to 0.13%.

10. The multi-cladding optical fiber according to claim 2, wherein the predetermined bending diameter is 80 to 200 mm.

11. The multi-cladding optical fiber according to claim 1, wherein the core is doped with a luminescent material.

12. The multi-cladding optical fiber according to claim 11, wherein the luminescent material is a rare earth element.

13. An optical fiber module formed by winding the multi-cladding optical fiber according to claim 1.

14. A fiber laser comprising the optical fiber module according to claim 13.

15. A fiber amplifier comprising the optical fiber module according to claim 13.

* * * * *